(12) United States Patent
London et al.

(10) Patent No.: US 9,745,063 B2
(45) Date of Patent: Aug. 29, 2017

(54) AIRBORNE ROCKET LAUNCH SYSTEM

(71) Applicant: Ventions, LLC, San Francisco, CA (US)

(72) Inventors: Adam P. London, San Francisco, CA (US); Lucas A. Hundley, Daly City, CA (US); Lloyd J. Droppers, Sunnyvale, CA (US)

(*) Notice: Subject to any disclaimer, the term of this patent is extended or adjusted under 35 U.S.C. 154(b) by 159 days.

(21) Appl. No.: 14/708,197

(22) Filed: May 9, 2015

(65) Prior Publication Data
US 2016/0039521 A1 Feb. 11, 2016

Related U.S. Application Data

(60) Provisional application No. 62/034,334, filed on Aug. 7, 2014.

(51) Int. Cl.
| | | |
|---|---|---|
| *B64C 37/02* | (2006.01) | |
| *B64D 5/00* | (2006.01) | |
| *B64G 1/00* | (2006.01) | |
| *B64D 7/08* | (2006.01) | |

(52) U.S. Cl.
CPC ............ *B64D 5/00* (2013.01); *B64D 7/08* (2013.01); *B64G 1/005* (2013.01)

(58) Field of Classification Search
CPC . B64D 5/00; B64D 7/08; B64D 47/00; B64D 1/12; F41F 3/052; F41F 3/06; F41F 3/00; F41F 3/04; F41F 3/055; F41F 7/00; B64G 1/005; B64G 1/401; B64C 30/00; F41B 10/60–10/668
See application file for complete search history.

(56) References Cited

U.S. PATENT DOCUMENTS

| 2,977,853 | A |   | 4/1961 | Gerkins et al. |   |
|---|---|---|---|---|---|
| 4,429,611 | A | * | 2/1984 | Oldham | F41F 3/06 89/1.8 |
| 4,557,444 | A | * | 12/1985 | Jackson | B64G 1/14 244/159.1 |

(Continued)

OTHER PUBLICATIONS

NPL1—Atlas III Rocket Information from astronautix.com. http://www.astronautix.com/a/atlas3a.html.*

(Continued)

*Primary Examiner* — Philip J Bonzell
(74) *Attorney, Agent, or Firm* — Keith L. Jenkins, Registered Patent Attorney, LLC; Keith L. Jenkins

(57) ABSTRACT

A system for air-launching a liquid fueled rocket launch vehicle using a tubular rocket support structure for holding the launch vehicle and for supplying the launch vehicle with make-up cryogenics, electrical power, and control signals, and for providing coupling to a launch-assist aircraft. The tubular rocket support structure contains cryogenic fluids, in addition to fuel and oxidizer, to cool the fuel and oxidizer during the pre-launch phase. The tubular rocket support structure has features that keep the liquid fuel and oxidizer from sloshing away from the tank outlet ports to the launch vehicle's rocket engine after release from the aircraft but before rocket launch. In operation, the aircraft controllably releases the tubular rocket support structure containing the launch vehicle, and the launch vehicle then launches from the rocket support structure.

22 Claims, 19 Drawing Sheets

(56) References Cited

U.S. PATENT DOCUMENTS

| | | | | |
|---|---|---|---|---|
| 4,901,949 A * | 2/1990 | Elias | | B64D 5/00 244/49 |
| 5,143,328 A * | 9/1992 | Leonard | | B64G 1/002 244/171.3 |
| 5,402,965 A * | 4/1995 | Cervisi | | B64G 1/005 244/159.3 |
| 6,068,211 A * | 5/2000 | Toliver | | B64G 1/14 244/158.5 |
| 6,119,985 A * | 9/2000 | Clapp | | B64C 39/02 244/135 R |
| 6,164,179 A | 12/2000 | Buffman | | |
| 6,193,187 B1 * | 2/2001 | Scott | | B64G 1/14 244/159.3 |
| 6,260,802 B1 * | 7/2001 | Hampsten | | B64D 1/00 244/137.1 |
| 6,543,715 B1 * | 4/2003 | Karpov | | B64D 1/10 244/137.1 |
| 6,612,522 B1 * | 9/2003 | Aldrin | | B64G 1/002 244/159.3 |
| 7,338,015 B1 * | 3/2008 | Sarigul-Klijn | | B64D 1/04 244/137.1 |
| 8,371,535 B2 * | 2/2013 | Grabmeier | | B64D 1/12 244/194 |
| 2002/0096041 A1 * | 7/2002 | Briggs | | F41F 3/0413 89/1.817 |
| 2004/0065779 A1 * | 4/2004 | Karpov | | B64D 1/10 244/137.3 |
| 2004/0188561 A1 * | 9/2004 | Ratkovic | | F41G 7/346 244/3.15 |
| 2006/0208136 A1 * | 9/2006 | Cook | | B64G 1/005 244/171.3 |
| 2006/0219839 A1 * | 10/2006 | Schneider | | F41G 7/301 244/3.26 |
| 2007/0007383 A1 * | 1/2007 | Hsu | | F42B 10/64 244/3.24 |
| 2010/0269677 A1 * | 10/2010 | Patel | | F41F 3/042 89/1.819 |
| 2010/0301159 A1 * | 12/2010 | Schnitzer | | B64D 1/04 244/54 |
| 2011/0265637 A1 * | 11/2011 | Hainze | | F41F 3/052 89/1.806 |
| 2012/0024136 A1 * | 2/2012 | McCants, Jr. | | B64D 1/04 89/1.819 |
| 2012/0061507 A1 * | 3/2012 | Grabmeier | | B64D 1/12 244/3.15 |
| 2012/0145028 A1 * | 6/2012 | Travis | | F42B 10/66 102/377 |
| 2012/0210852 A1 * | 8/2012 | McCants, Jr. | | B64D 1/04 89/1.8 |
| 2013/0299626 A1 * | 11/2013 | Smith | | B64D 5/00 244/2 |
| 2014/0238223 A1 * | 8/2014 | Strahl | | F41F 3/052 89/1.816 |
| 2014/0242831 A1 * | 8/2014 | Strahl | | F41F 3/052 439/374 |
| 2015/0267996 A1 * | 9/2015 | Su | | B64C 39/024 89/1.816 |
| 2016/0047639 A1 * | 2/2016 | Roemerman | | F42B 8/22 102/498 |

OTHER PUBLICATIONS

NPL2—Atlas V Rocket Information from Spaceflight101.com. http://spaceflight101.com/spacerockets/atlas-v-551/.*

* cited by examiner

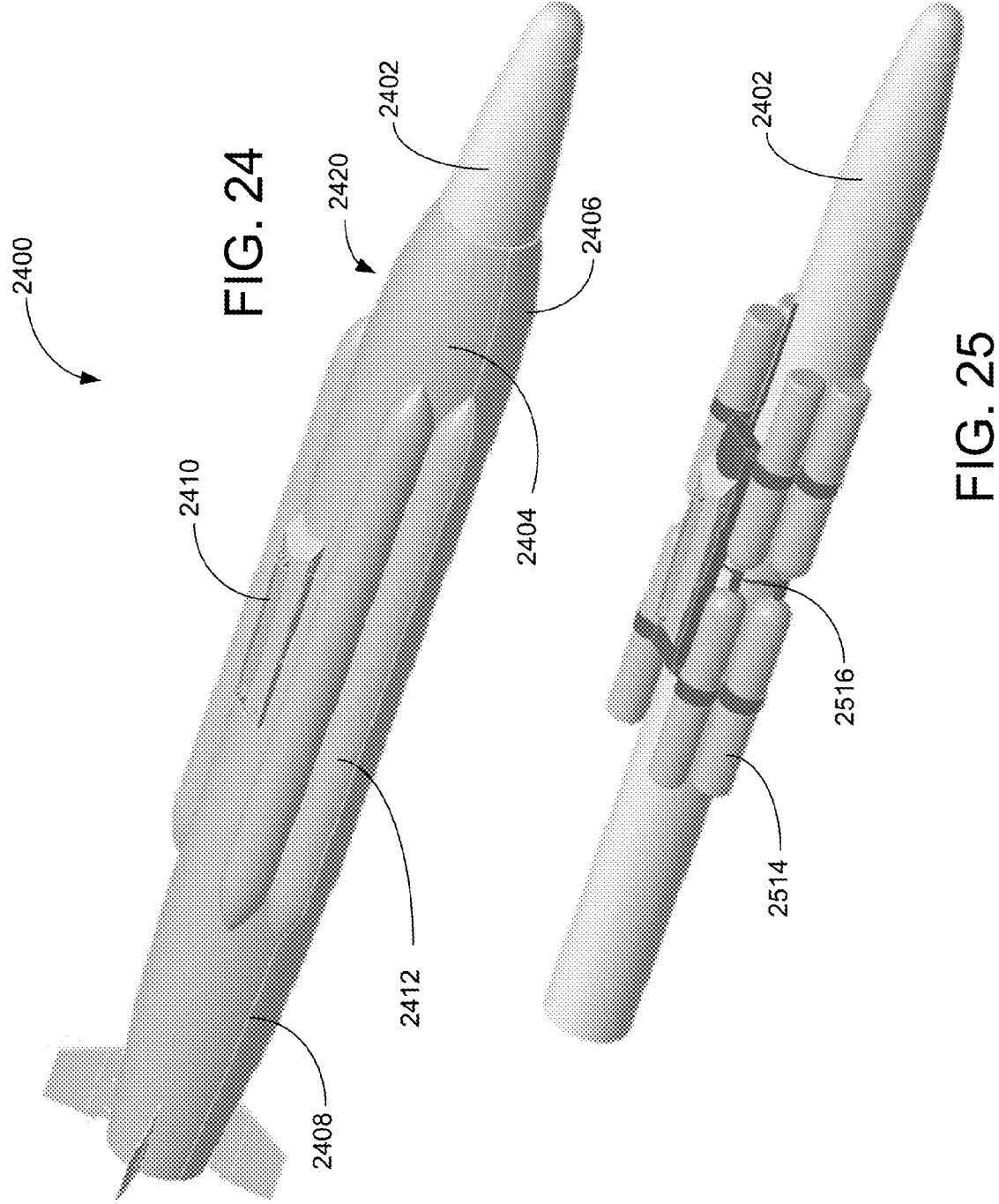

AIRBORNE ROCKET LAUNCH SYSTEM

RELATED APPLICATIONS

This application claims the benefit of U.S. provisional patent application Ser. No. 62/034,334 filed Aug. 7, 2014 for the same inventors.

STATEMENT REGARDING FEDERALLY SPONSORED RESEARCH OR DEVELOPMENT

This invention was made with government support under contract FA865012C7274 awarded by the Department of the Air Force. The government has certain rights in the invention. The research in this document is being developed by Ventions, LLC with funding from the Defense Advanced Research Projects Agency (DARPA). Distribution Statement A: Approved for Public Release, Distribution Unlimited.

TECHNICAL FIELD

This invention relates to providing an airborne system for launching rockets. This invention more particularly relates to launching satellites using liquid-fueled rockets launched from airborne platforms.

BACKGROUND

Launching satellites from airborne platforms using solid rocket motors has been developed. For example, the Pegasus rocket is carried aloft under an L-1011 aircraft and air-launched to carry a satellite into orbit. However, liquid fueled rockets, which have a higher specific impulse and can hence provide better payload mass fractions than solid propellant rockets, have not been air-launched because of complex fluid control and propellant management requirements.

Therefore, a need exists for a system for air-launching high-performance liquid-fueled rockets from airborne platforms.

OBJECTS AND FEATURES OF THE INVENTION

A primary object and feature of the present invention is to provide a system that provides a rocket support structure (such as a containment launch tube) in which to carry a liquid fueled rocket aloft.

It is a further object and feature of the present invention to provide a system that provides a standardized interface with multiple aircraft types to support the rocket support structure coupled to the aircraft during ascent to launch altitude.

It is a further object and feature of the present invention to provide a system that includes cryogenic fluids for fuel and oxidizer replenishment and/or cooling during airborne ascent.

It is a further object and feature of the present invention to provide a rocket support structure that supports the loads occasioned by airborne operations so that the rocket structure itself can be made lighter.

It is a further objective to surround the cryogenic propellant in the rocket with a colder cryogenic fluid in an external tank that is thermally connected to the rocket propellant tank, so as to limit boil-off of the cryogenic propellant prior to launch and during captive carry flight to the launch location.

It is a further objective to thermally isolate the aircraft interface and other critical components from the cryogenic liquid in any external cooling tank, if utilized, via a system of thermally isolating, yet structurally strong linkages.

It is a further object and feature of the present invention to provide a rocket support structure that has its own thrusters to provide acceleration to the rocket so that the rocket's liquid fuel is forced back towards the engine inlet, rather than moving away from the inlet due to aerodynamic deceleration after release from the aircraft and before rocket engine ignition.

It is a further object and feature of the present invention to provide an alternative rocket support structure that uses aerodynamic deceleration of a reverse-mounted rocket so that the rocket's liquid fuel is forced back towards the engine inlet, rather than moving away from the inlet after release from the aircraft and before rocket engine ignition.

It is an additional primary object and feature of the present invention to provide such a system that is efficient, inexpensive, versatile, and handy. Other objects and features of this invention will become apparent with reference to the following descriptions.

SUMMARY OF THE INVENTION

A system including air support equipment, a rocket support structure, and a liquid-fueled rocket, in which the rocket is supported within the rocket support structure. The rocket support structure can either be coupled directly to an aircraft, or coupled indirectly via the air support equipment which is coupled to the aircraft. In one implementation, the air support equipment also provides for storage of extra cryogenic liquid propellants for replenishment of propellants lost to boil-off from the rocket propellant tanks during airborne operations. In another implementation, the air support equipment provides storage of a colder cryogenic liquid that is used as a coolant to prevent or reduce boil-off of the cryogenic liquid propellants inside the liquid-fueled rocket. The cryogenic liquid coolant is transferred between the air support equipment storage and the rocket support structure or rocket via retractable quick disconnects.

In another implementation, the cryogenic liquid storage may be incorporated into the rocket support structure, for example as a wrap-around tank, and serve as coolant. In this case, the coolant may be a colder cryogenic liquid than the rocket propellant (for example, liquid nitrogen may be used in a wrap-around tank to cool liquid oxygen in the rocket).

In another implementation, additional propellant storage may be incorporated into the rocket support structure, for example as a wrap-around tank, and serve to top-off the rocket propellant tanks before launch, as is customary with ground launched vehicles.

Electrical connections to the rocket and rocket support structure, for power and signals, are provided by the air support equipment, or directly via the rocket support structure in scenarios where it is directly coupled to the aircraft and where there is no air support equipment.

Since the rocket preferably ignites after release from the aircraft, and this requires that propellant be present at the engine intake positions within the rocket tanks, in one implementation, the rocket support structure produces acceleration to force the liquids to the engine inlets, either by small solid rocket motors or aerodynamic deceleration of a reverse-mounted rocket.

BRIEF DESCRIPTION OF THE DRAWINGS

The present invention will hereinafter be described in conjunction with the following drawing figures, wherein like numerals denote like elements.

FIG. 24 is a perspective view illustrating a fourth exemplary embodiment showing a tubular housing with a horizontal split plane that allows the rocket to be released after the tubular housing splits into an upper and lower portion;

FIG. 25 is a perspective view illustrating the fourth exemplary embodiment of the rocket launch system of FIG. 24 showing internal fluid elements of the tubular housing and rocket, such as may be visible with the outer aerodynamic fairings removed.

DETAILED DESCRIPTION OF THE PRESENT INVENTION

Figure 1:
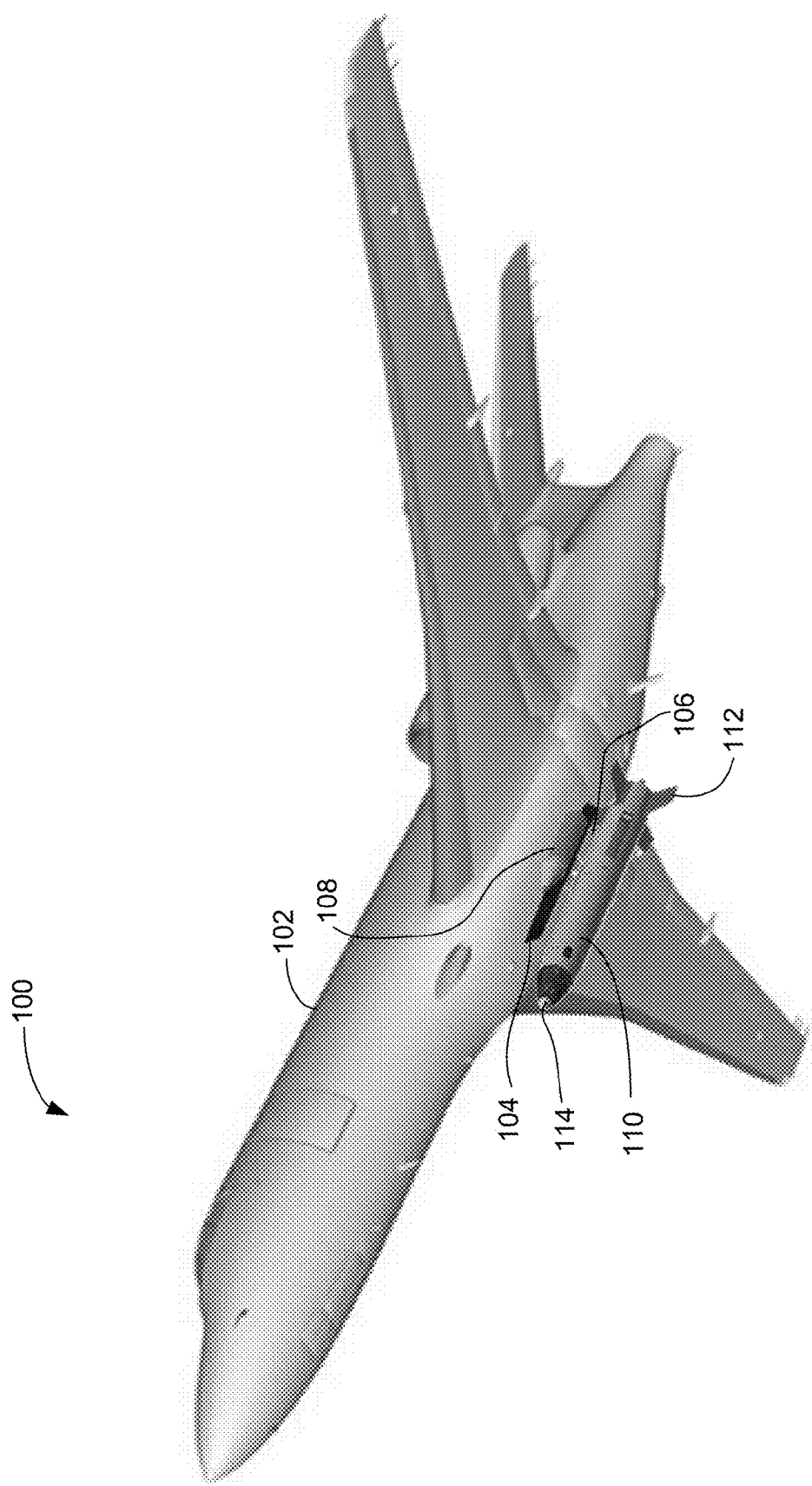
FIG. 1 is a front low perspective view illustrating a first exemplary embodiment of the airborne rocket launch system, according to a preferred embodiment of the present invention.

FIG. 1 is a front low perspective view illustrating a first exemplary embodiment of the airborne rocket launch system 100, according to a preferred embodiment of the present invention. Launch assist aircraft 102 has a pylon 104 which carries air support equipment 106 which, in turn, supports cryogenic liquid tanks 108 and releasably couples rocket support structure 110. Rocket support structure 110 has a tubular housing and stabilizer fins 112 and supports liquid fueled rocket 114 inside rocket support structure 110. Liquid fueled rocket 114, or launch vehicle 114, uses cryogenic propellants (fuel and oxidizer), and cryogenic coolant. Fuel and oxidizer are separately tanked and conducted to respective inlets of at least one rocket engine in the launch vehicle 114. Rocket support structure 110 is illustrated as a tube with fins 112, but the invention is not so limited. Fins 112 may be articulated to allow for additional control, or fixed for passive stability of the structure following release from the aircraft. Various rocket support structures 110 may be used which meet the functional constraints to be discussed below. Launch assist aircraft 102 may be any variety of aircraft capable of carrying the operational load and achieving the desired altitude. An aircraft without a pylon 104 can be equipped with one.

A control system having elements in the launch assist aircraft 102, rocket support structure 110, and launch vehicle 114 is employed for operational control. Control elements within the aircraft 102 control, among other things, the separation of the rocket support structure 110 from the aircraft 102. Control elements within the rocket support structure 110 control, among other things, the launch of the launch vehicle 114 from the rocket support structure 110. Control elements within the launch vehicle 114 control, among other things, the ignition sequence and ignition timing for the launch vehicle 114.

Figure 2:
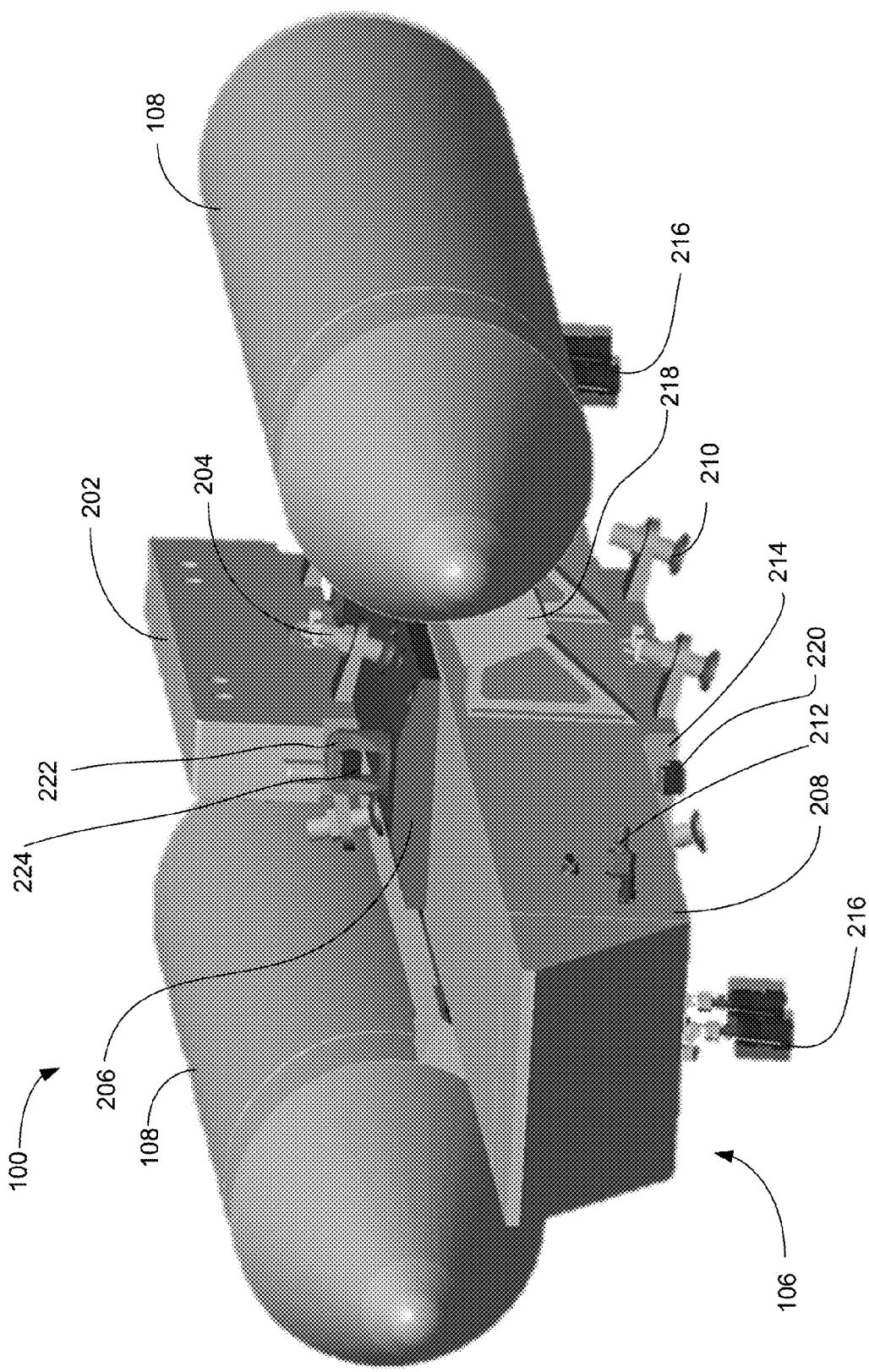
FIG. 2 is a front-side perspective view illustrating the first exemplary embodiment of air support equipment of the airborne rocket launch system of FIG. 1, according to a preferred embodiment of the present invention.

FIG. 2 is a front-side perspective view illustrating the first exemplary embodiment of air support equipment 106 of the airborne rocket launch system 100 of FIG. 1, according to a preferred embodiment of the present invention. Pylon interface 202 couples to the launch assist aircraft 102 and provides four sway brace arms 204 (one of two visible labeled) in opposed pairs. Pylon interface panel 206 is ejectably coupled to pylon interface 202 via interface mounting lugs 222 (forward one of two visible) that engage retractable tongues 224 (forward one of two visible). Pylon interface panel 206 is fixed to air support equipment housing 208. If needed in case of emergency to maintain safety of flight of the launch assist aircraft 102, the air support equipment 106 can be jettisoned from the launch assist aircraft 102, either before or after release of rocket support structure 110. Air support equipment housing 208 provides structural support, fluidic couplings and controls, and electrical couplings and controls for both power and signals. Fluidic couplings include at least one ground support equipment fluids interface valve 212 for filling cryogenic tanks 108. Supports 218 (one of two in view labeled) maintain cryogenic tanks 108 in fixed spaced-apart relation to air support equipment housing 208. Fluidic couplings 216 to cryogenic tanks 108 provide fluids (fuel, oxidizer, and/or coolant) to liquid fueled rocket 114 and are mechanically disconnected under remote control immediately before release of rocket support structure 110. Rocket support structure ejector housing 214 houses ejector cartridges and mechanisms for ejecting the rocket support structure 110 to ensure a safe release from the launch assist aircraft 102. Four launch tube sway brace arms 210 (one of three visible labeled) stabilize the rocket support structure 110 during airborne operations. Retractable tongues 220 (forward one of two visible) engage mounting lugs 304 (see FIG. 3) to releasably connect the rocket support structure 110 to the air support equipment 106 and, thereby, to the launch assist aircraft 102.

In case of emergency, the air support equipment 106 may also be jettisoned before or after release of the rocket support structure 110 to maintain safety of flight of launch assist aircraft 102. For example, if the rocket support structure release signal results in a hang fire, the entire air support equipment 106, with the rocket support structure 110 and liquid fueled rocket 114 attached, can be separated from the launch assist aircraft 102.

Figure 3:
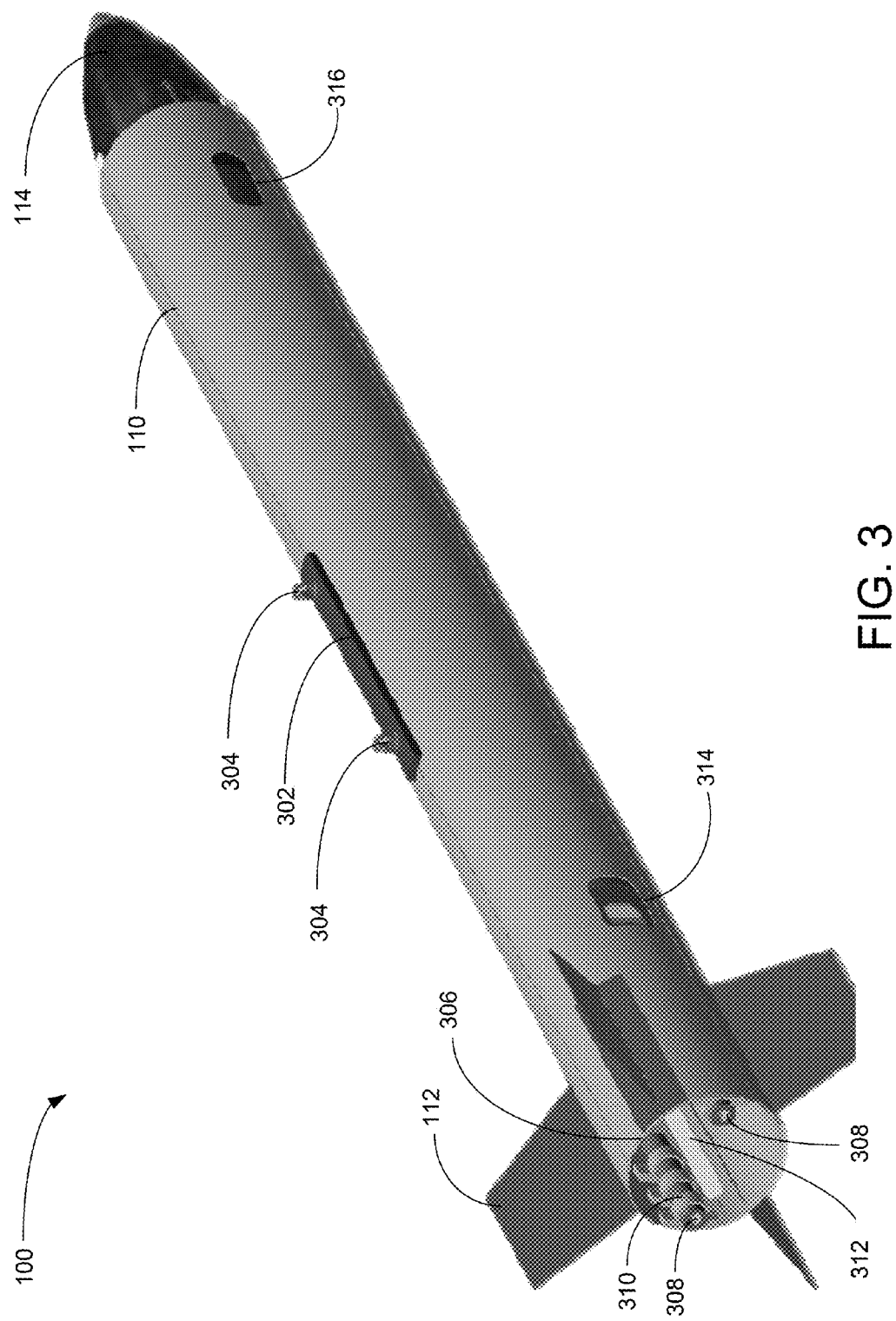
FIG. 3 is a side perspective view illustrating the first exemplary embodiment of the of the airborne rocket launch system of FIG. 1, according to a preferred embodiment of the present invention.

FIG. 3 is a side perspective view illustrating the first exemplary embodiment of the rocket support structure 110 of the airborne rocket launch system 100 of FIG. 1, according to a preferred embodiment of the present invention. Rocket support structure 110 may be made of metal, such as aluminum, or lightweight composites, such as carbon-epoxy composite. The rocket support structure 110 may be expendable or recoverable and reusable, depending on operational parameters. Rocket support structure 110 is illustrated as a right circular cylinder, as shown, with aft quick disconnect access panel 314 and forward quick disconnect access panel 316 for fluids, power and signals. Portions of liquid fueled rocket 114 can be seen through aft quick disconnect access panel 314 and forward quick disconnect access panel 316. The aft rim 306 surrounds an open aft end of rocket support structure 110. Stabilization thrusters 308, secured to rocket support structure 110 by supports 310, accelerate the rocket support structure 110 after release from the launch assist aircraft 102 to ensure that fuel is available at the engine inlet (or the tank outlet, depending on the internal rocket tank) at the rear of the internal rocket tanks, rather than sloshed forward by aerodynamic deceleration after release from the launch assist aircraft 102. Stabilization thrusters 308 are sized to overcome aerodynamic deceleration between release of the rocket support structure 110 and the ignition of the engines of the liquid fueled rocket 114. Stabilization thrusters 308 are preferably solid rocket motors but are not limited to this and could utilize other liquid or hybrid types of propellants.

Mounting hardware 302 is fixed to the rocket support structure 110 and has two mounting lugs 304 that are releasably engaged to the rocket support structure ejector housing 214 via retractable tongues 220 during airborne operations. The surface of mounting hardware 302 receives the force of the ejector when the rocket support structure 110 is ejected. In particular operations, the rocket support structure 110 may be simply released, rather than ejected with pressure.

The nose cone of liquid fueled rocket 114 may extend out of the front of rocket support structure 110 to provide an overall aerodynamic shape and reduce drag during captive carry under launch assist aircraft 102.

Figure 4:
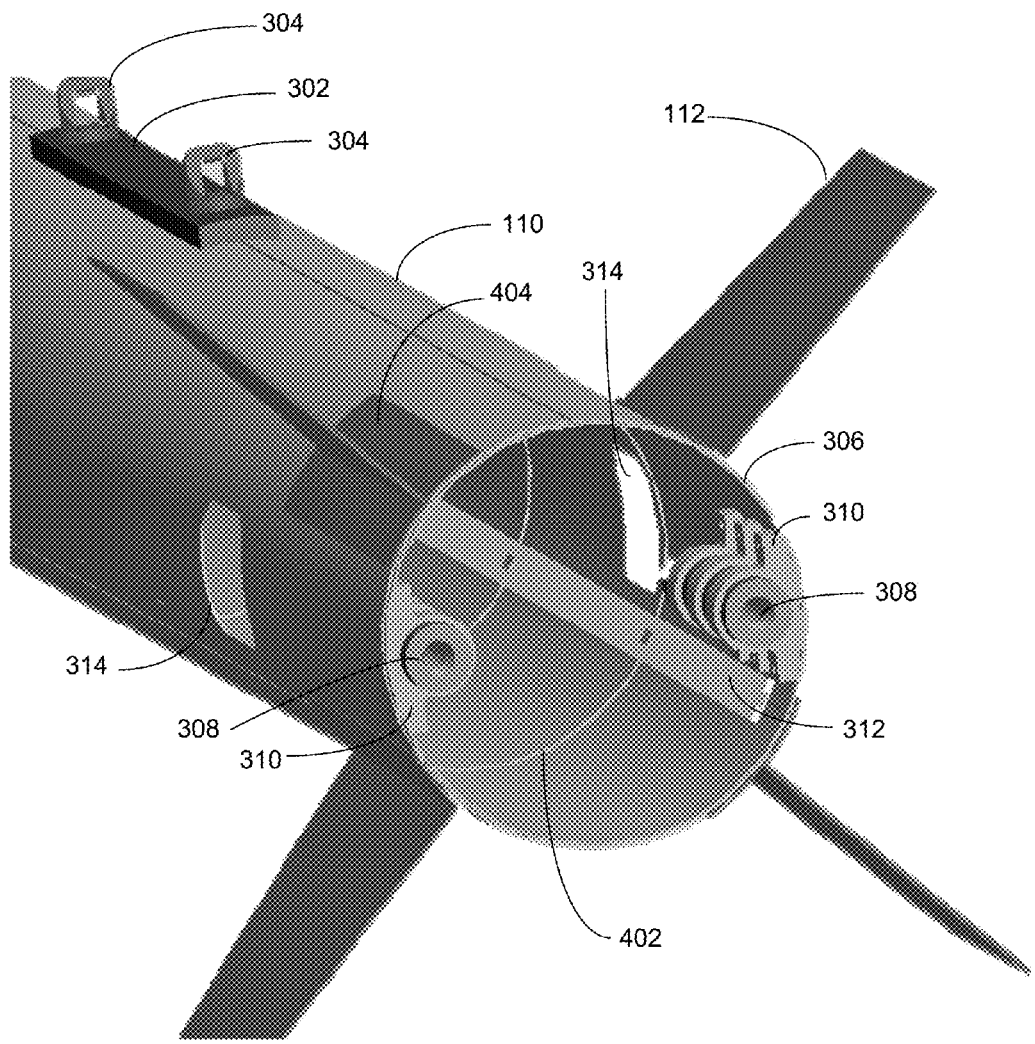
FIG. 4 is a rear perspective view illustrating details of the first exemplary embodiment of the rocket support structure of the airborne rocket launch system of FIG. 1, according to a preferred embodiment of the present invention.

FIG. 4 is a rear perspective view illustrating details of the first exemplary embodiment of the rocket support structure 110 of the airborne rocket launch system 100 of FIG. 1, according to a preferred embodiment of the present invention. Fins 112 (one of four labeled) are preferably of one piece with fin supports 404 and are fixed to rocket support structure 110. The fins may be passive or articulated for active control after release from the aircraft. Low-friction rails 312 (one visible in this view) are preferably coated with a low-friction coating such as Teflon. At least two low-friction rails 312 are used to slidingly engage the exterior surface of liquid fueled rocket 114 to ease the exit of liquid fueled rocket 114 from the rocket support structure 110 after rocket engine ignition.

Rocket support structure 110 preferably has annular support ribs 402 (one of three visible labeled) which are overlaid with low-friction rails 312.

Figure 5:
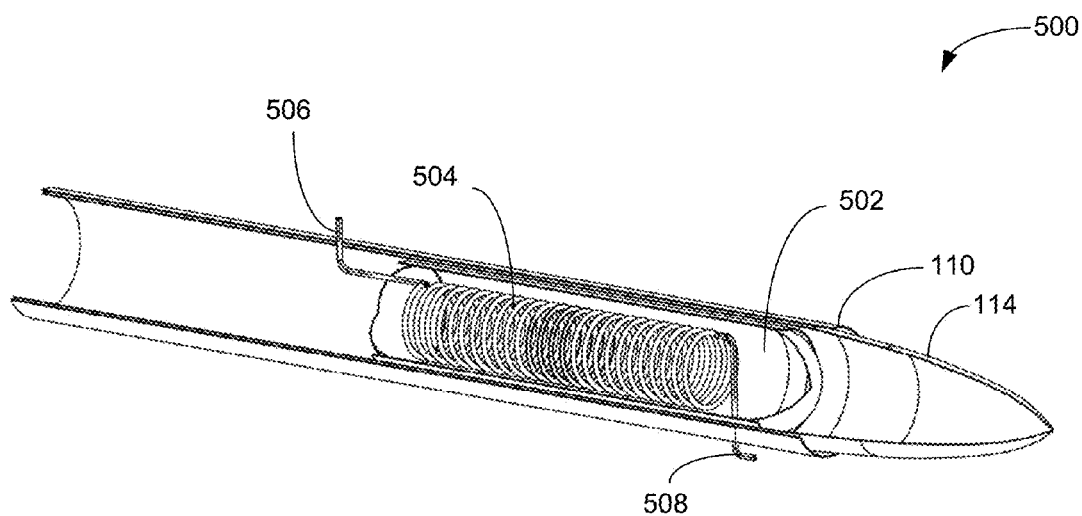
FIG. 5 is a perspective cut-away view illustrating a first exemplary embodiment of a cooling system of the liquid fueled rocket of the airborne rocket launch system of FIG. 1, according to a preferred embodiment of the present invention.

FIG. 5 is a perspective cut-away view illustrating a first exemplary embodiment of a cooling system 500 of the liquid fueled rocket 114 of the airborne rocket launch system 100 of FIG. 1, according to a preferred embodiment of the present invention. Insulated cryogenic fluid tank 502 within liquid fueled rocket 114 contains a heat exchanger 504 through which colder cryogenic fluids from air support equipment 106 fluid tanks 108 can be made to flow, thereby cooling the cryogenic propellant, such as liquid oxygen, within the tank 502. Cryogenic cooling fluid, such as liquid nitrogen, enters through retractable quick release fluid inlet coupling 506 and exits, as liquid or gas, through vent 508. The rate of supply of cooling fluid at inlet coupling 506 and the restriction at vent 508 determines the amount of cooling, which is determined for each mission. Heat exchanger 504 is illustrated as a coiled tube, but the invention is not limited as to the type of heat exchanger 504. Short portions of the tube of heat exchanger 504 are an enclosure within the rocket support structure 110.

Figure 6:
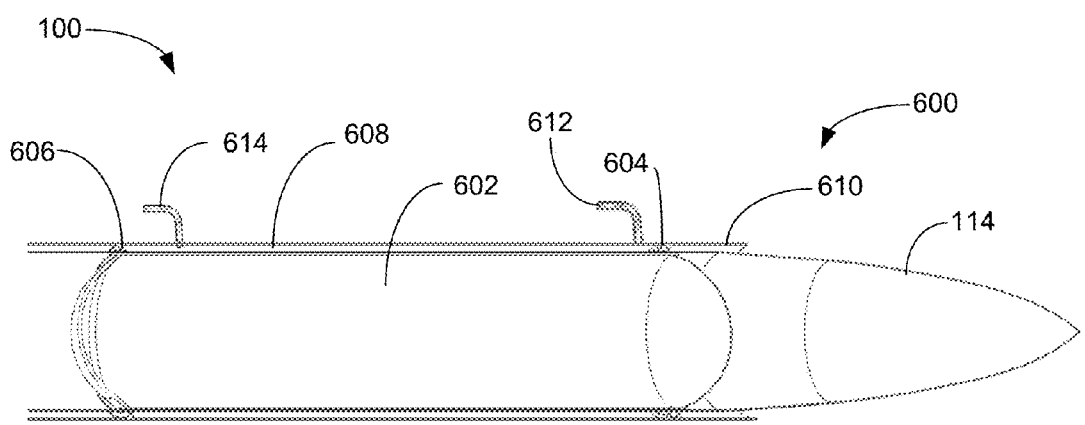
FIG. 6 is a perspective cut-away view illustrating a second exemplary embodiment of a cooling system of the liquid fueled rocket of the airborne rocket launch system of FIG. 1, according to a preferred embodiment of the present invention.

FIG. 6 is a perspective cut-away view illustrating a second exemplary embodiment of a cooling system 600 of the liquid fueled rocket 114 of the airborne rocket launch system 100 of FIG. 1, according to a preferred embodiment of the present invention. In this embodiment, a plenum 608 is formed between the outer surface of the un-insulated cryogenic fluid tank 602, which is an external wall of the liquid fueled rocket 114, the inner surface of insulated rocket support structure 610, and fore and aft seals 604 and 606, respectively. Coolant, such as liquid nitrogen, is introduced into the plenum 608 through retractable fluid inlet quick disconnect coupling 614 and exits, as liquid or gas, through vent 612. The plenum 608 comprises an enclosure within the rocket support structure 610.

Figure 7:
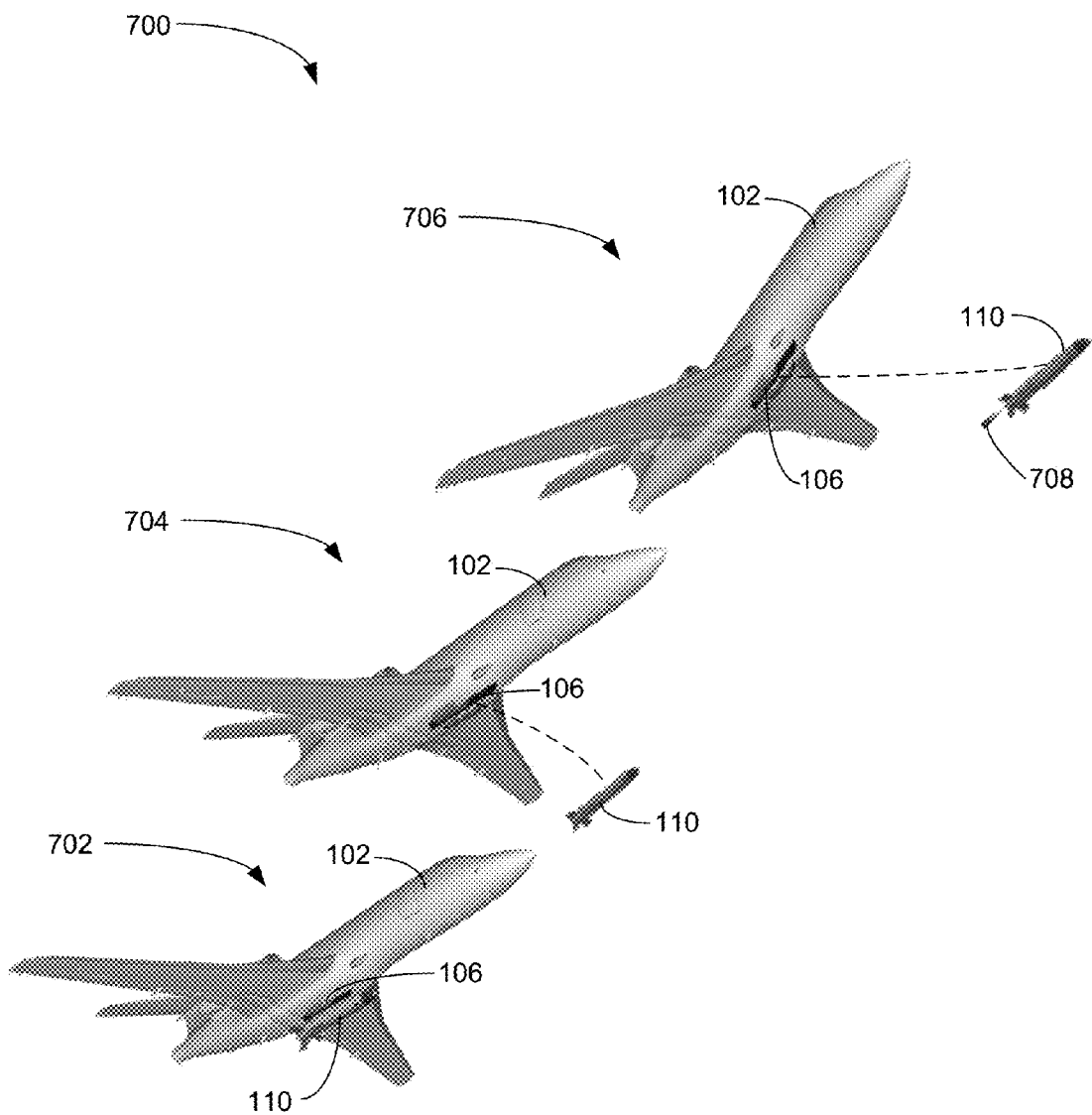
FIG. 7 is a sequential perspective view illustrating a first exemplary embodiment of the initial launch sequence of the airborne rocket launch system of FIG. 1, according to a preferred embodiment of the present invention.

FIG. 7 is a sequential perspective view illustrating a first exemplary embodiment of the initial launch sequence 700 of the airborne rocket launch system 100 of FIG. 1, according to a preferred embodiment of the present invention. In the first step 702 of the sequence 700, liquid fueled rocket 114 is housed within the rocket support structure 110 which is releasably coupled to air support equipment 106 which, in turn, is releasably coupled to launch assist aircraft 102. Launch assist aircraft 102 is ascending. In step 704 of the sequence 700, the rocket support structure 110 is released to free fall and is aerodynamically stabilized by fins 112. "Release" may include ejection or an inertia-assisted release without ejection. In step 706 of the sequence 700, after a sufficient amount of time has passed to safely clear the launch assist aircraft 102, the thrusters 308 on rocket support structure 110 have ignited 708 to accelerate rocket support structure 110 sufficiently to move the liquid propellants to the rear of their respective tanks within liquid fueled rocket 114. Launch assist aircraft 102 is safely maneuvering away from the rocket support structure 110 to avoid interference with the trajectory of the liquid fueled rocket 114.

Figures 8, 9, 10:
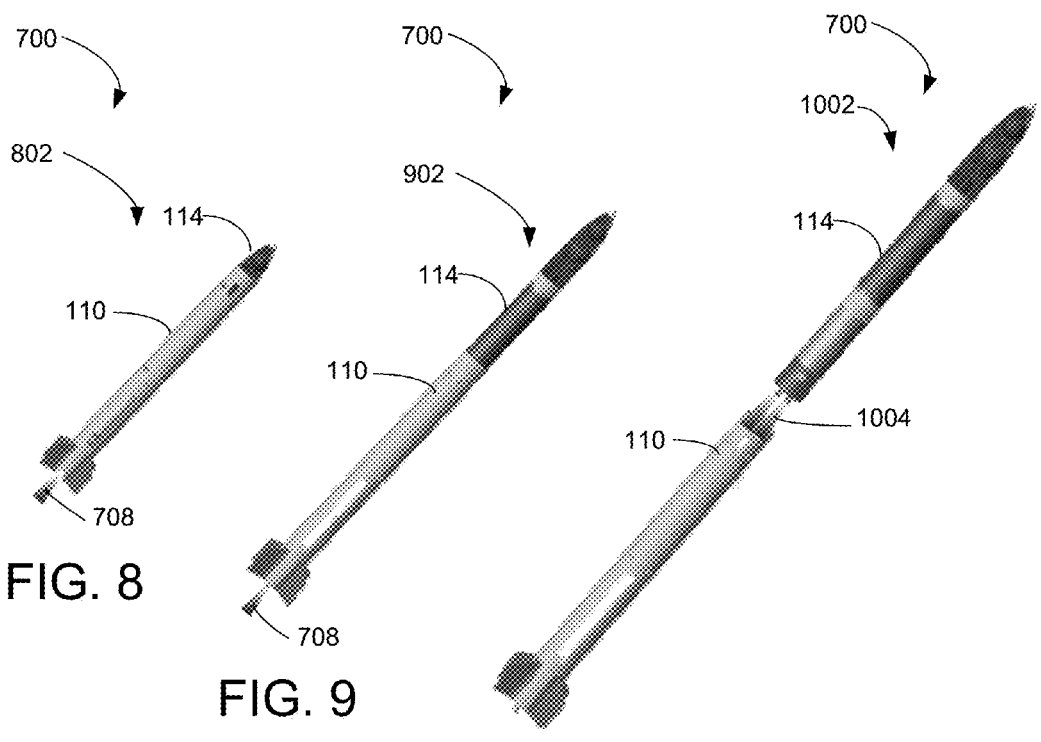
FIG. 8 is a perspective view illustrating a first exemplary embodiment of the accelerating rocket support structure of the airborne rocket launch system of FIG. 1, according to a preferred embodiment of the present invention.
FIG. 9 is a perspective view illustrating a first exemplary embodiment of the liquid fueled rocket launching from the accelerating rocket support structure of FIG. 8 of the airborne rocket launch system of FIG. 1, according to a preferred embodiment of the present invention.
FIG. 10 is a perspective view illustrating a first exemplary embodiment of the liquid fueled rocket launched from the rocket support structure of FIG. 8 of the airborne rocket launch system of FIG. 1, according to a preferred embodiment of the present invention.

FIG. 8 is a perspective view illustrating a first exemplary embodiment of the accelerating rocket support structure 110 of the airborne rocket launch system 100 of FIG. 1, according to a preferred embodiment of the present invention. In step 802 of sequence 700, liquid fueled rocket 114 is about to ignite its rocket engines and thrusters 308 of rocket support structure 110 are still firing to produce positive acceleration on the structure. The firing signal for the liquid fueled rocket 114 engines is stored in the liquid fueled rocket 114, for example, to occur after a specific time after release from the launch assist aircraft 102. In a particular embodiment, the firing signal may be communicated wirelessly to the liquid fueled rocket 114 and may be conditional on telemetry received in the launch assist aircraft 102 or on receiving stations on the ground from the liquid fueled rocket 114 or rocket support structure 110.

FIG. 9 is a perspective view illustrating a first exemplary embodiment of the liquid fueled rocket 114 launching from the accelerating rocket support structure 110 of FIG. 8 of the airborne rocket launch system 100 of FIG. 1, according to a preferred embodiment of the present invention. In step 902 of sequence 700, the main engines of the liquid fueled rocket 114 have ignited and are thrusting the liquid fueled rocket 114 out of the rocket support structure 110. Thrusters 308 are still thrusting the rocket support structure 110 forward, but are much less powerful than the main engines of the liquid fueled rocket 114, and so the liquid fueled rocket 114 cleanly exits and leaves the rocket support structure 110 behind allowing it to fall to Earth while the liquid fuel rocket 114 begins its launch trajectory to orbit.

FIG. 10 is a perspective view illustrating a first exemplary embodiment of the liquid fueled rocket 114 launched from the rocket support structure 110 of FIG. 8 of the airborne rocket launch system 100 of FIG. 1, according to a preferred embodiment of the present invention. In step 1002 of sequence 700, the liquid fueled rocket 114 is free of the rocket support structure 110 and is proceeding under its own power 1004. Thrusters 308 on rocket support structure 110 have run out of fuel and rocket support structure 110 falls to Earth. In a particular embodiment, rocket support structure 110 may be equipped with an aerodynamic decelerator.

Figure 11:
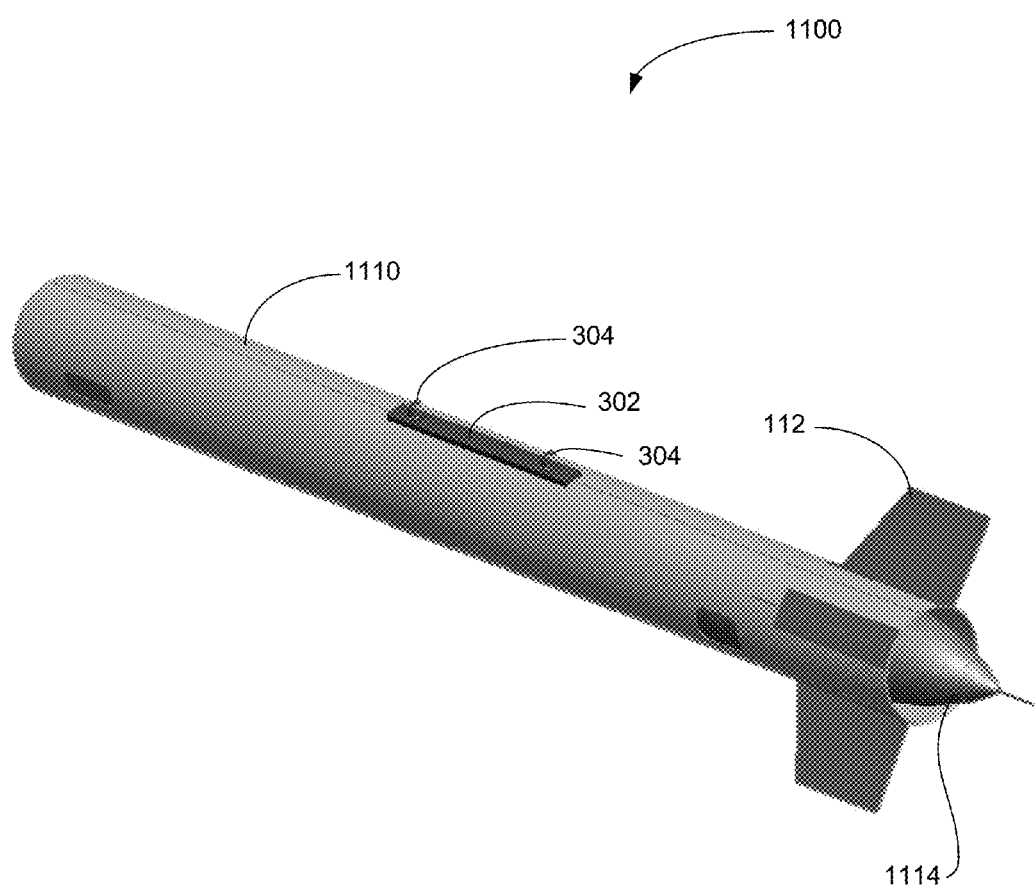
FIG. 11 is a side-rear perspective view illustrating a second exemplary embodiment of a rocket support structure of the airborne rocket launch system, according to a second preferred embodiment of the present invention.

FIG. 11 is a side-rear perspective view illustrating a second exemplary embodiment of a rocket support structure 1110 of an airborne rocket launch system 1100, according to a second preferred embodiment of the present invention. Liquid-fueled rocket 1114 is reverse-mounted in rocket support structure 1110, which has no thrusters 308. Rocket support structure 1110 is otherwise similar to rocket support structure 110. Rocket support structure 1110 is designed to free fall with fin stabilization, using aerodynamic deceleration to move the liquid fuel and oxidizer to the outlets of their respective internal rocket tanks, and then launch liquid-fueled rocket 1114 out of the aft end of the rocket support structure 1110 once the rocket support structure 1110 reaches desired orientation. Air support equipment 106 is the same for rocket support structure 1110, with some changes in the quick disconnects. Preferably, the rocket support structure 1110 and the rocket support structure 110 differ only by minor modifications that can be made in the field.

Figure 12:
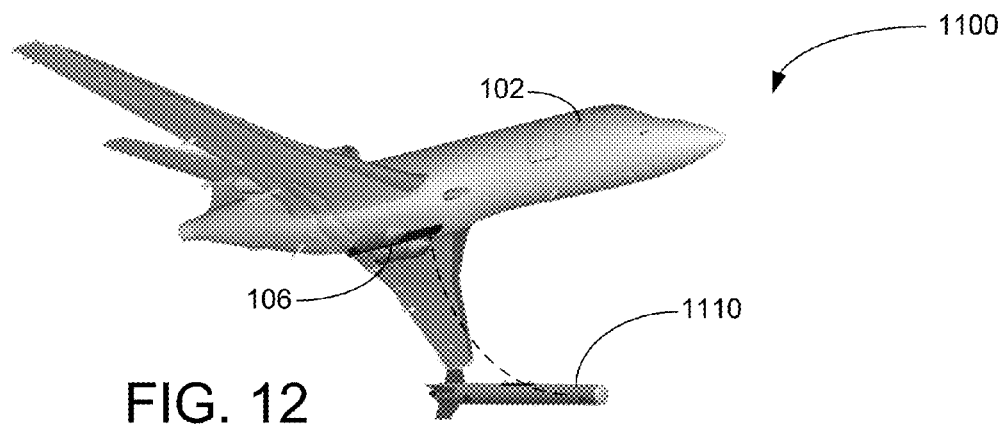
FIG. 12 is a bottom perspective view illustrating the second exemplary embodiment of a rocket support structure separated from a launch assist aircraft of the airborne rocket launch system of FIG. 11, according to a preferred embodiment of the present invention.

FIG. 12 is a bottom perspective view illustrating the second exemplary embodiment of a rocket support structure 1110 separated from a launch assist aircraft 102 of the airborne rocket launch system 1100 of FIG. 11, according to a preferred embodiment of the present invention. Rocket support structure 1110, carrying liquid-fueled rocket 1114, is released and in free fall, aerodynamically stabilized by fins 112 and aerodynamically decelerating to move the liquid fuel and oxidizer to the outlets of their respective internal rocket tanks. Structures such as drag flaps may also be deployed to provide additional deceleration.

Figure 13:
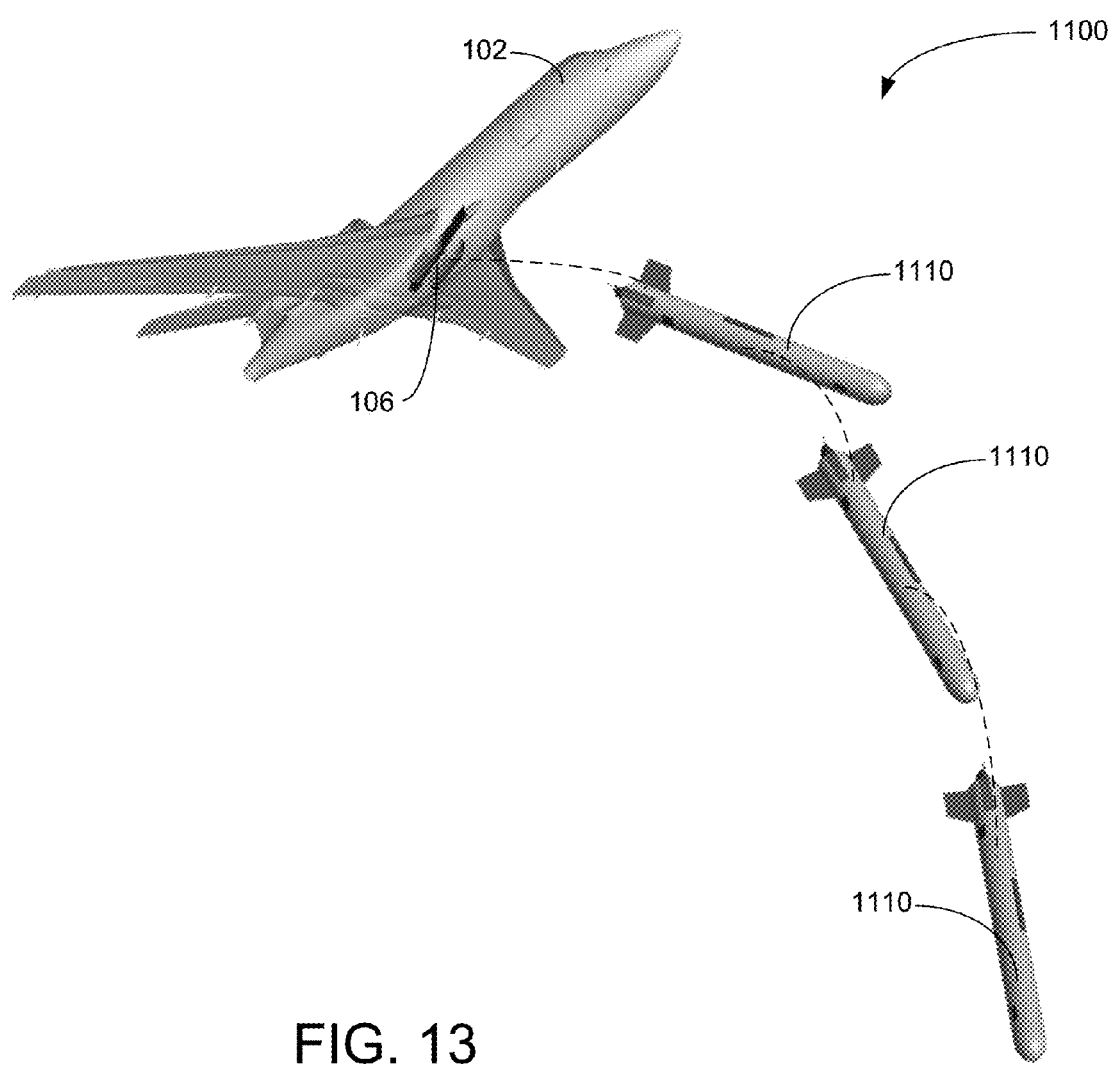
FIG. 13 is a bottom perspective view illustrating the second exemplary embodiment of the rocket support structure of FIG. 12 in free fall from the launch assist aircraft of the airborne rocket launch system of FIG. 11, according to a preferred embodiment of the present invention.

FIG. 13 is a bottom perspective view illustrating the second exemplary embodiment of the rocket support structure 1110 of FIG. 12 in free fall from the launch assist aircraft 102 of the airborne rocket launch system 1100 of FIG. 11, according to a preferred embodiment of the present invention. As rocket support structure 1110 free falls, it is aerodynamically oriented to a fins-up orientation, as shown, which puts reverse-mounted liquid-fueled rocket 1114 in a nose-up orientation (see FIG. 11) and with liquids at tank outlets.

Figure 14:
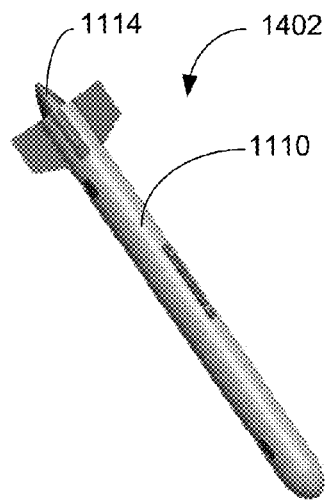
FIG. 14 is a side perspective view illustrating the second exemplary embodiment of the rocket support structure of FIG. 12 just prior to rocket ignition of the liquid fueled rocket of the airborne rocket launch system of FIG. 11, according to a preferred embodiment of the present invention.

FIG. 14 is a side perspective view illustrating the second exemplary embodiment of the rocket support structure 1110 of FIG. 12 just prior to rocket ignition of the reverse-mounted liquid fueled rocket 1114 of the airborne rocket launch system 1100 of FIG. 11, according to a preferred embodiment of the present invention. In step 1402, rocket support structure 1110, carrying liquid-fueled rocket 1114 is separated from aircraft 102 and is aerodynamically decelerating. Liquid-fueled rocket 1114 can be more clearly seen in step 1502 and 1602.

Figure 15:
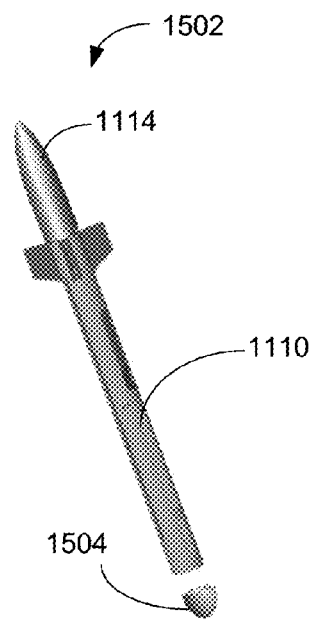
FIG. 15 is a side perspective view illustrating the second exemplary embodiment of the rocket support structure of FIG. 12 just after rocket ignition of the liquid fueled rocket of the airborne rocket launch system of FIG. 11, according to a preferred embodiment of the present invention.

FIG. 15 is a side perspective view illustrating the second exemplary embodiment of the rocket support structure 1110 of FIG. 12 just after rocket ignition of the reverse-mounted liquid fueled rocket 1114 of the airborne rocket launch system 1100 of FIG. 11, according to a preferred embodiment of the present invention. In step 1502, expanding gases from the engines of the liquid-fueled rocket 1114 blow off the nose cap 1504 of rocket support structure 1110 as the reverse-mounted liquid-fueled rocket 1114 begins to exit rocket support structure 1110. In a particular embodiment, nose cap 1504 may be ejected prior to rocket engine ignition. In a particular embodiment, nose cap 1504 may be captive, perhaps by a cable, to minimize debris production. In a particular embodiment, blowing off the nose cap 1504 may deploy an aerodynamic decelerator, such as a parachute, to provide a soft landing and subsequent recovery for re-use of the rocket support structure 1110.

Figure 16:
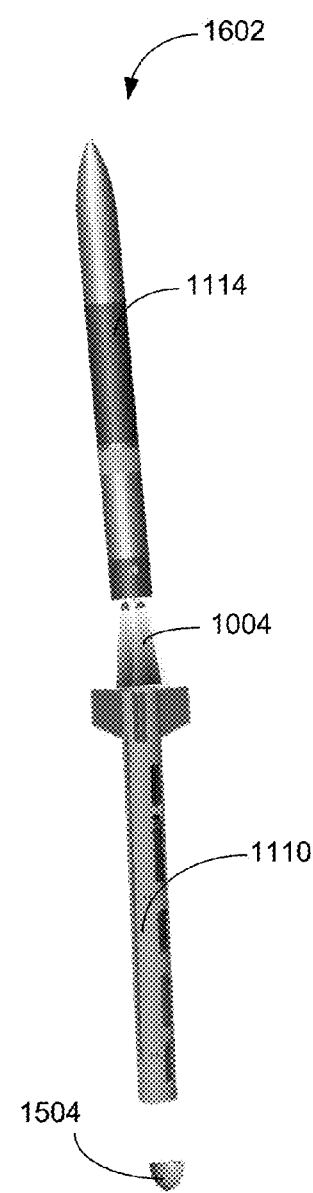
FIG. 16 is a side perspective view illustrating the second exemplary embodiment of the rocket support structure of FIG. 12 just after launch of the liquid fueled rocket of the airborne rocket launch system of FIG. 11, according to a preferred embodiment of the present invention.

FIG. 16 is a side perspective view illustrating a second exemplary embodiment of the rocket support structure of FIG. 12 just after launch of the reverse-mounted liquid fueled rocket 1114 of the airborne rocket launch system 1100 of FIG. 11, according to a preferred embodiment of the present invention. Reverse-mounted liquid-fueled rocket 1114 is free of rocket support structure 1110 and under its own power 1004. Rocket support structure 1110 and nose cap 1504 fall to Earth.

Figure 17:
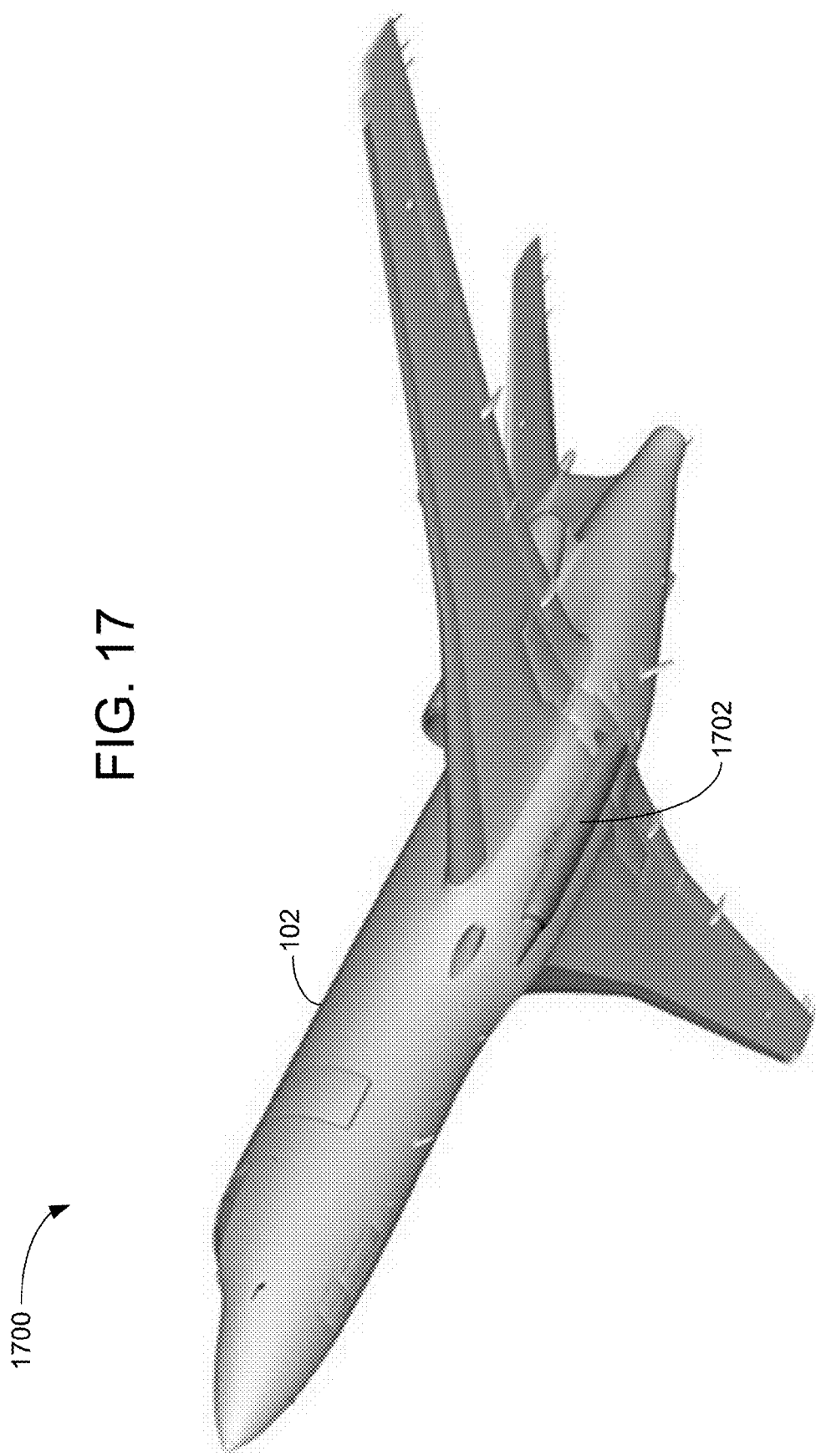
FIG. 17 is a front low perspective view illustrating a third exemplary embodiment of the airborne rocket launch system, with a third exemplary embodiment of the rocket support structure that mounts directly to the aircraft without intermediary air support equipment, according to a preferred embodiment of the present invention.

FIG. 17 is a front low perspective view illustrating a third exemplary embodiment of the airborne rocket launch system 1700, with a third exemplary embodiment of the rocket support structure 1702 that mounts directly to the aircraft 102 without intermediary air support equipment 106, according to a preferred embodiment of the present invention. Airborne rocket launch system 1700 also intrinsically incorporates a wrap-around tank for cryogenic liquid storage or cooling, as will be further described below and may have all the attributes of previously described launch system 100.

Figure 18:
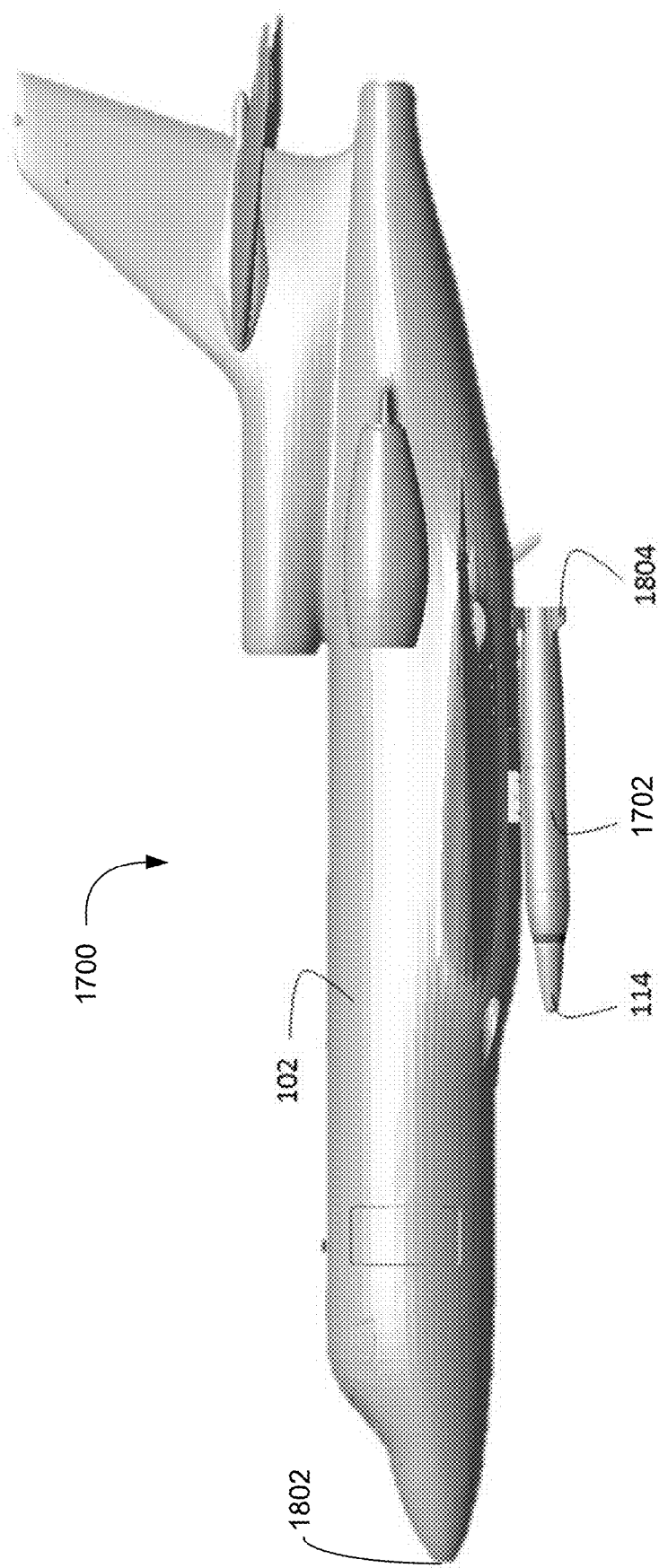
FIG. 18 is a side view illustrating the third exemplary embodiment of the rocket launch system of FIG. 17, with a third exemplary embodiment of the rocket support structure which mounts directly to the aircraft, according to a preferred embodiment of the present invention.

FIG. 18 is a side view illustrating the third exemplary embodiment of the rocket launch system 1700, with a third exemplary embodiment of the rocket support structure 1702 which mounts directly to the aircraft 102, according to a preferred embodiment of the present invention. Rocket launch system 1700 integrally incorporates cryogenic liquid storage. Fins 1804 provide aerodynamic stabilization once the rocket support structure 1702 with rocket 114 inside it is released from the aircraft 102 and before rocket 114 has ignited and separated from the rocket support structure 1702. Fins 1804 may be passive or articulated. The rocket support structure 1702 may have an aerodynamic shape to reduce drag during captive carry and release.

Rocket support structure 1702 and rocket 114 may be aligned at an angle to the aircraft 102 (for example, two degree nose down) via a wedge shaped strong-back. During release, the aircraft 102 will have an angle of attack. In case it is desired that the rocket support structure 1702 and rocket 114 have a lower angle of attack during release, attaching the rocket support structure 1702 away from the nose 1802 of the aircraft 102 will reduce the angle of attack of the released structure to reduce loads or post-release oscillations.

Figure 19:
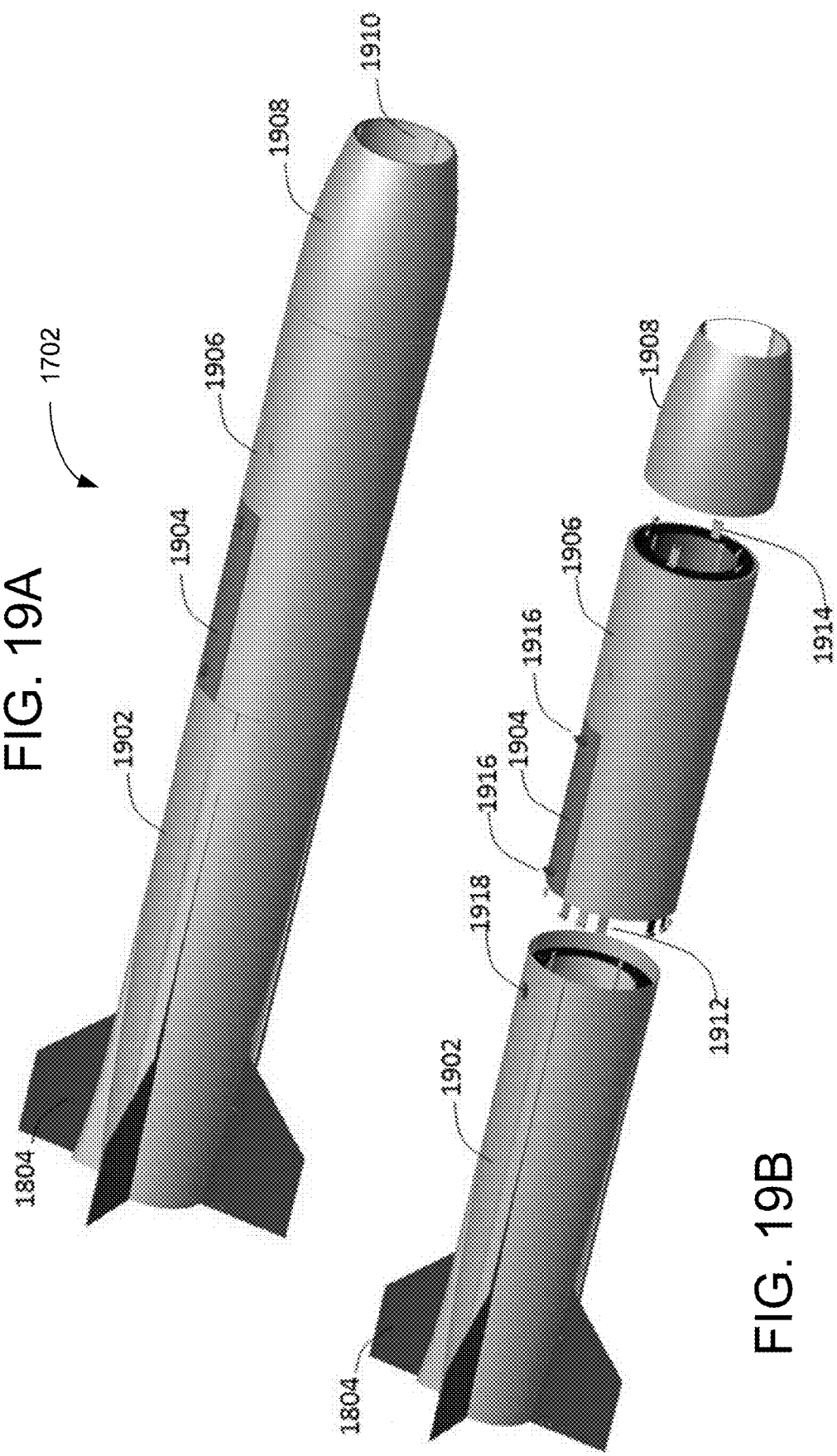
FIG. 19A is a perspective view illustrating the third exemplary embodiment of the rocket support structure of FIG. 17, according to a preferred embodiment of the present invention.
FIG. 19B is a perspective view illustrating the third exemplary embodiment of the rocket support structure of FIG. 17, with the three sections separated, according to a preferred embodiment of the present invention.

FIG. 19A is a perspective view illustrating the third exemplary embodiment of the rocket support structure 1702, according to a preferred embodiment of the present invention. In the preferred embodiment, the rocket support structure 1702 is assembled from three primary components. The aft portion 1902 supports the aft end of the rocket as well as the stabilization fins 1804. The center section 1906 contains the internal wrap-around tank for storage of cryogenic fluid, and is sized to mostly cover the main cryogenic propellant tank inside the rocket 114. The strongback 1904 is the mounting interface to the aircraft 102 and is in turn attached to the center section 1906. The forward section 1908 supports the upper stage and fairing of the rocket 114, and contains the opening 1910 from which the rocket 114 emerges during ignition and separation from the rocket support structure 1702.

FIG. 19B is a perspective view illustrating the third exemplary embodiment of the rocket support structure 1702, with the three sections 1902, 1906 and 1908 separated, according to a preferred embodiment of the present invention. Aft section 1902 supports a power and data connector 1918 for providing electrical power and for providing navigation and control data from the launch assist aircraft 102 to rocket support structure 1702 and rocket 114. Because center section 1906 contains a wrap-around tank 2026 (see FIG. 20) of cryogenic fluid 2012 (see FIG. 20) that, in a preferred implementation, is used to prevent or minimize boil off of the cryogenic propellant 2006 (see FIG. 20) in the rocket 114, it is desired to thermally isolate the center section 1906 from the aft section 1902 and the forward section 1908. The thermal isolation means that the central section 1906 will be very cold and tend to shrink in dimension more than the aft or forward sections 1902 and 1908 and therefore the connection must be thermally isolating, compliant to shrinkage, yet stiff enough to transfer loads from the rocket to the airplane successfully. In one preferred embodiment, this is accomplished through the use of flexures 1912 and 1914. Aft flexures 1912 connect the center section 1906 to the aft section 1904, and the set of forward flexures 1914 connect the center section 1906 to forward section 1908. Since the inertial loads of the aft section are often larger than those of the forward section, the total required stiffness will be larger, and so in a preferred embodiment, there are twelve aft flexures 1912, but only four forward flexures 1914. Lugs 1916 are attached to the strongback 1904, and are captured by hooks on the launch assist aircraft 102 which open to release the rocket support structure 1702 and rocket 114 once the desired launch condition is reached.

Figure 20:
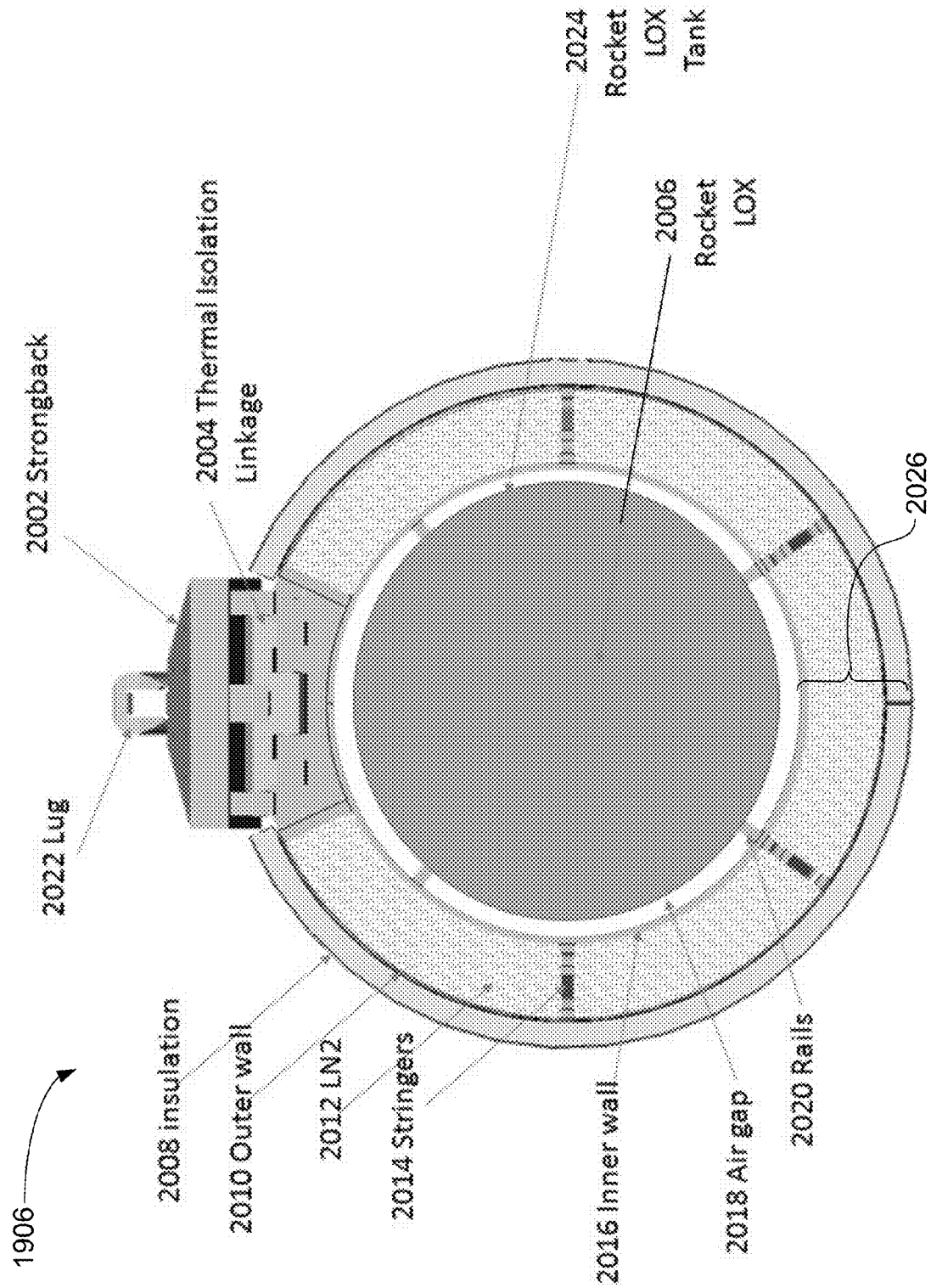
FIG. 20 is a cross section through the center section of the third embodiment of the rocket support structure of FIGS. 17, 18 and 19A-B, showing the wrap-around tank full of a cryogenic liquid, according to a preferred embodiment of the present invention.

FIG. 20 is a cross section through the center section 1906 of the third embodiment of the rocket support structure 1702 of FIGS. 17, 18 and 19A-B, showing the wrap-around tank 2026 full of a cryogenic liquid 2012, according to a preferred embodiment of the present invention. The liquid 2012 in wrap-around tank 2026, such as liquid nitrogen, is surrounded by an outer wall 2010 and inner wall 2016 of the wrap-around tank 2026, which are connected and supported by stringers 2014. The stringers 2014 have openings to allow the cryogenic fluid 2012 to flow freely between internal sections or compartments of the wrap-around tank 2026. The wrap-around tank 2026 surrounds a rocket tank 2024 full of cryogenic propellant 2006. The cryogenic liquid 2012 in the wrap-around tank 2026, typically liquid nitrogen or liquid argon, is thermally connected to the cryogenic propellant 2006 via the small air gap 2018, the rails 2020, or other thermally conductive means. The outer wall 2010 is covered by a relatively thick layer of insulation 2008 to minimize the boil off of the cryogenic liquid 2012 due to heating from the external environment through the outer wall 2010. The wrap around tank 2026 does not extend all the way to the top of the inner wall 2016, since that is where the mounting of the center section 1906 to the strongback 2002 is accomplished. The strongback 2002 is attached to the airplane 102 via lugs 2022, and preferentially will remain at the same temperature as the airplane. This means substantial thermal isolation is required between the strongback 2002 and both the inner wall 2016 and the cryogenic liquid 2012. But this joint must also be strong enough to transfer the full inertial and aerodynamic loads experienced by the rocket 114 and rocket support structure 1702 into the strongback 2002 and airplane 102. These functions are accomplished by the thermal isolation linkage 2004. Wrap around tank 2026 in center section 1906 of rocket support structure 1702 is an enclosure within rocket support structure 1702.

Figure 21:
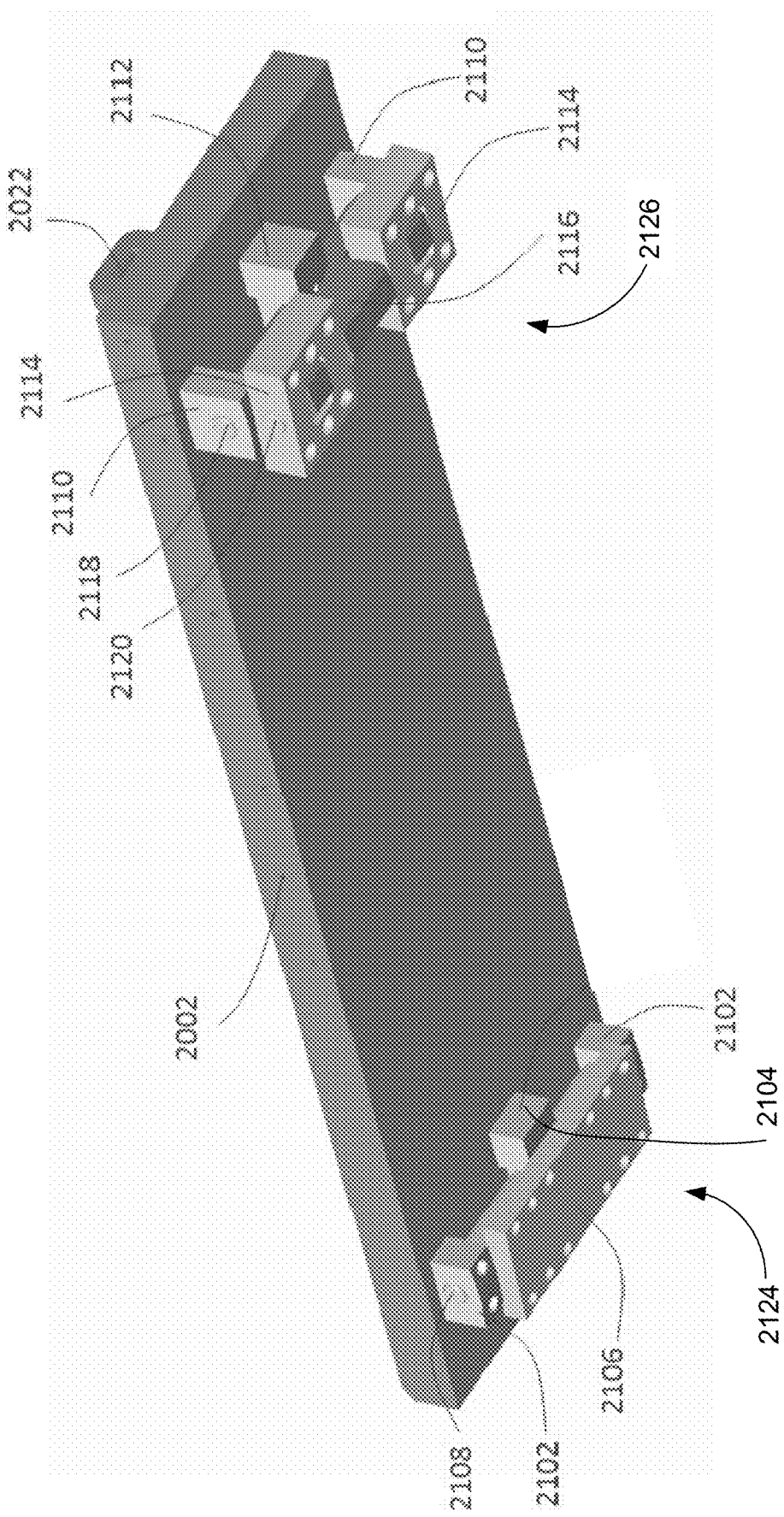
FIG. 21 is a perspective view from below showing the linkage and mounting system that holds the rocket support structure of FIG. 17 to the aircraft while thermally isolating the internal cryogenic storage tank.

FIG. 21 is a perspective view from below showing the linkage and mounting system that holds the rocket support structure 1702 of FIG. 17 to the aircraft 102 while thermally isolating the internal cryogenic storage tank 2024, according to a preferred embodiment of the present invention. Strongback 2002 provides the structural interface to the aircraft 102 via lugs 2022. On the lower side of the strongback 2002 the forward and aft linkages 2126 and 2124 transfer the inertial and aerodynamic loads between aircraft 102 and rocket support structure 1702 and rocket 114. On the aft linkage 2124, outer pivot blocks 2102 and center pivot block 2104 are bolted into the strongback 2002 and support a pin 2108, preferably made from titanium for its high strength and low thermal conductivity. The pin 2108 in turn supports the aft anchor block 2106, which is bolted onto the top of the center section of the rocket support structure 1702. The forward linkage is designed to accommodate the change in length of the rocket support structure 1702 that occurs when the wrap-around tank 2026 is filled with cryogenic liquid 2012 and all of its dimensions shrink. On the forward linkage 2126, outer pivot blocks 2110 and center pivot block 2112 are bolted to the forward portion of the strongback 2002 directly underneath the lug 2022. Upper pin 2118 is supported by the pivot blocks 2110, and transfers loads into swing arm 2116, which also supports lower pin 2120. Lower pin 2120 then supports the two forward anchor blocks 2114, which bolt onto the top of the center section 1906 of the rocket support structure 1702. Not shown are bushings between the pins and mating parts to ensure the pins are able to rotate and to further increase the thermal resistance across the linkages.

Figure 22:
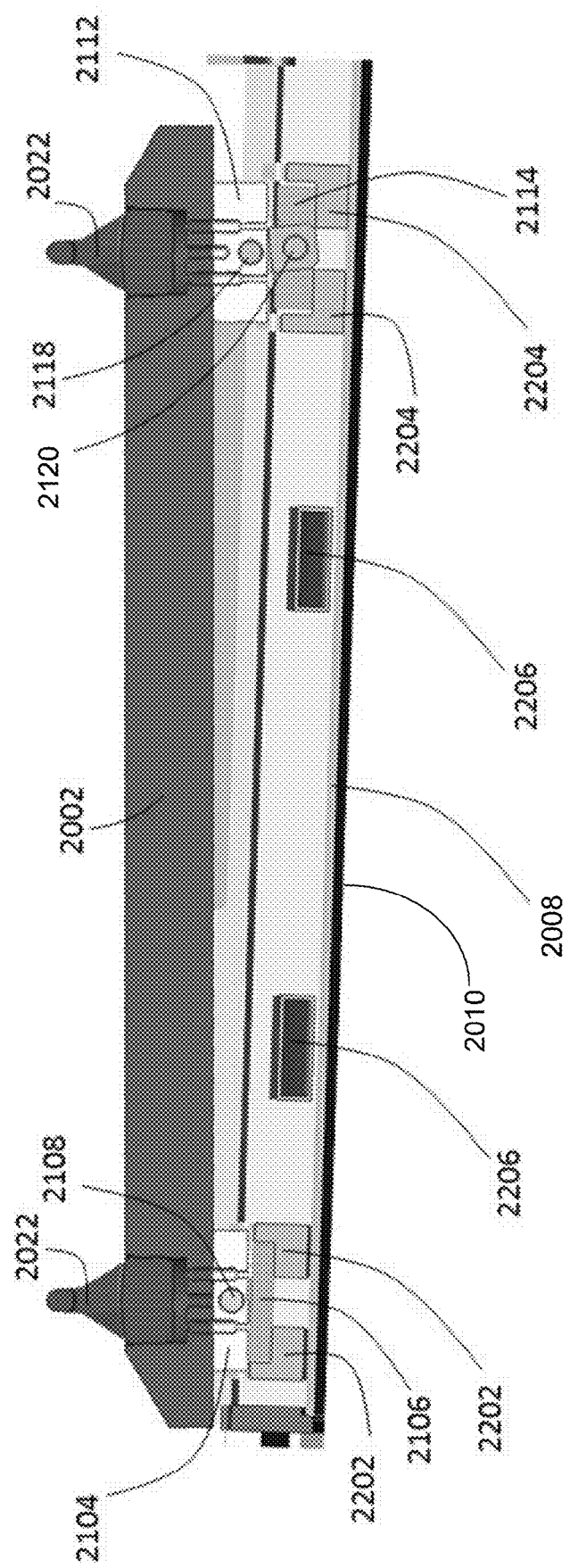
FIG. 22 is a cross section view illustrating the center plane of the linkage and mounting system that holds the rocket support structure of FIG. 17 to the aircraft while thermally isolating the internal cryogenic storage tank, according to a preferred embodiment of the present invention.

FIG. 22 is a cross section view illustrating the center plane of the linkage and mounting system of FIG. 21 that holds the rocket support structure 1702 to the aircraft 102 while thermally isolating the internal cryogenic storage tank 2024, according to a preferred embodiment of the present invention. In addition to illustrating the components also shown in FIG. 21 and described above, aft mounting cross members 2202 are shown, which are the part of the center section 1906 of the rocket support structure 1702 where aft anchor block 2106 is bolted or otherwise attached. Similarly, forward mounting cross members 2204 are the part of the center section 1906 of the rocket support structure 1702 where forward anchor blocks 2114 are bolted or otherwise attached. Ullage tube connectors 2206 are also shown, which allow the gas cavities on top of the cryogenic fluid on each side of the wrap-around tank 2026 that would otherwise be isolated to communicate fluidically.

In this view, the strong back 2002 is arranged to change the angle of the rocket 114 and rocket support structure 1702 relative to the axis of the aircraft 102, and reduce the angle of attack upon release to minimize loads and oscillations.

Figure 23:
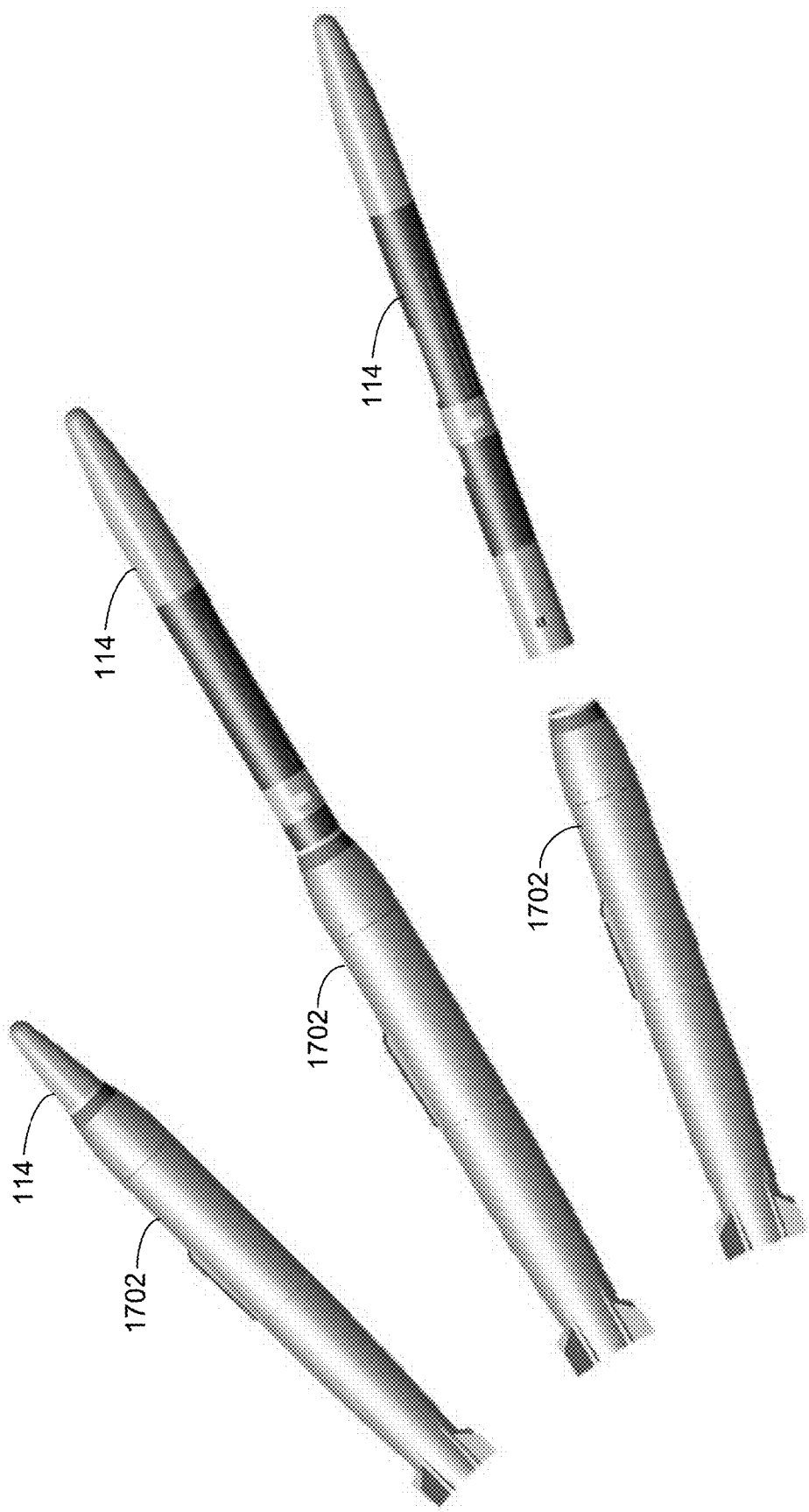
FIG. 23 is a perspective view illustrating a third exemplary embodiment showing the rocket leave the rocket support structure of the rocket support structure of FIG. 17 with an integral wrap around tank, according to a preferred embodiment of the present invention; The launch tube has aerodynamic fairings so reduce drag during captive carry and free fall.

FIG. 23 is a perspective view illustrating the third exemplary embodiment wherein rocket 114 leaves rocket support structure 1702 of FIG. 17 and there is no air support equipment 106, according to a preferred embodiment of the present invention. The rocket support structure 1702 has aerodynamic fairings to reduce drag during captive carry and free fall. The rocket support structure 1702 with integral wrap around tank 2026 (see FIG. 20) drops to the ground after rocket 114 is released.

Figure 26:
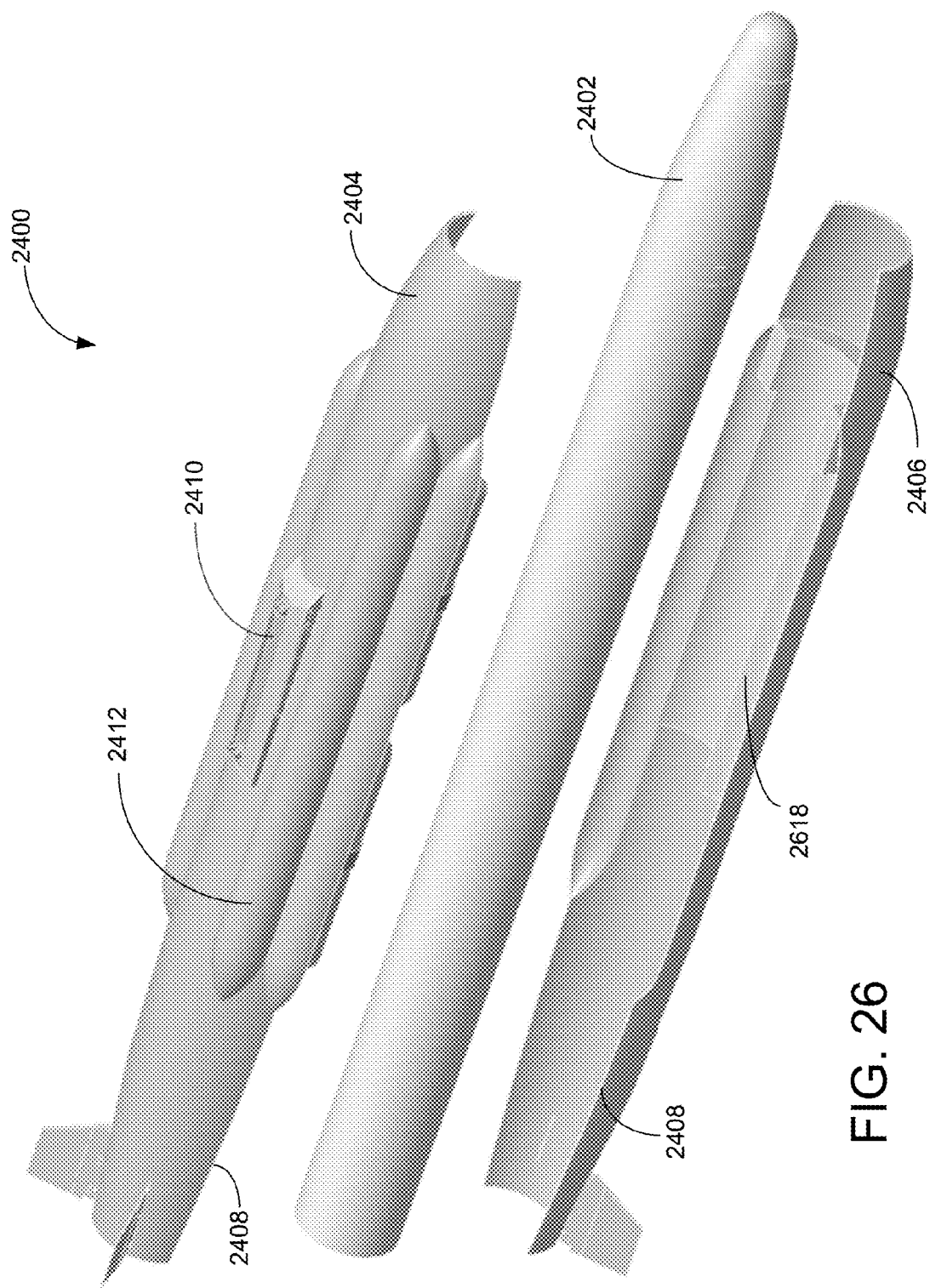
FIG. 26 is an exploded perspective view illustrating the fourth exemplary embodiment of the rocket launch system of FIG. 24 showing the rocket launch system at the point of release of the rocket from the tubular housing that is split along a horizontal plane.

FIGS. 24 to 26 are perspective views illustrating a fourth exemplary embodiment of rocket launch system 2400, according to a preferred embodiment of the present invention. Rocket launch system 2400 comprises a tubular housing 2420 with a horizontal split plane 2408 that allows the launch vehicle 2402 to be released from the tubular housing 2420 via a separation event where the tubular housing 2420 splits into an upper portion 2404 and a lower portion 2406, leaving the launch vehicle 2402 unconstrained and already in free flight. Tubular housing 2420, together with its internal parts discussed below, is a variety of a rocket support structure.

FIG. 24 is a perspective view illustrating the fourth exemplary embodiment of rocket launch system 2400 fully assembled, according to a preferred embodiment of the present invention. Rocket launch system 2400 comprises a tubular housing 2420 capable of splitting into two portions 2404 and 2406 along the axis of the tubular housing 2420, with a horizontal split line 2408 visible, and the launch vehicle 2402 mounted inside the tubular housing 2420. Top portion 2404 comprises the aircraft interface 2410 and a plurality of axial aero fairings 2412 (one of three visible labeled). The aircraft interface 2410 allows the tubular housing 2420 plus launch vehicle 2402 assembly 2400 to mount to the aircraft 102 for takeoff and cruise and then release from the aircraft 102 at the desired release point.

FIG. 25 is a perspective view illustrating exemplary embodiments of internal cryogenic fluid elements 2514 and 2516 of the tubular housing upper portion 2404 and the launch vehicle 2402 of FIG. 24, according to a preferred embodiment of the present invention. Internal cryogenic fluid elements 2514 and 2516 are illustrated with the tubular housing 2420 removed. This embodiment shows a series of standard cylindrical tanks 2514 (one of seven visible labeled) to store cryogenic fluid, as well as cryogenic plumbing elements 2516 to connect the multiple tanks 2514 together and to direct cryogenic fluid within the tubular housing 2420 and/or to the launch vehicle 2402, as required. This figure shows standard cylindrical tanks 2514, though custom-designed tanks 2514, for non-limiting example semi-circumferential tanks 2514, could be used for storage of the cryogenic fluid in other embodiments. The cryogenic fluids stored in tanks 2514 are, on a tank-by-tank basis, either propellant or coolant. Tanks 2514 are enclosures within tubular housing 2420 of rocket launch system 2400.

FIG. 26 is an exploded perspective view illustrating the fourth exemplary embodiment of the rocket launch system 2400 of FIG. 24 deploying, according to a preferred embodiment of the present invention. FIG. 26 illustrates rocket launch system 2400 after release from aircraft 102 and at the point of release of the launch vehicle 2402 from the tubular housing 2420. The tubular housing 2420 is shown split along its horizontal split plane 2408 with the upper portion 2404 moving clear above the launch vehicle 2402, and the lower portion 2406 moving clear below. One preferred sequence of events would be for the rocket of the launch vehicle 2402 to ignite its engines, and then immediately command the separation of the two halves 2404 and 2406 of the tubular housing 2420, allowing the launch vehicle 2402 to fly freely for the remainder of its flight. Another exemplary sequence would be for the separation of the tubular housing 2420 to occur at or nearly at the same time as the rocket engine ignition. The separation of the two halves 2404 and 2406 along the horizontal split plane 2408 could be accomplished by simultaneous release of a multi-point attachment mechanism, or by an explosive detonation cord, such as is often used in launch vehicle payload fairing separation mechanisms. FIG. 26 also shows the interior of the lower portion 2406 of the tubular structure which includes a region of insulation 2618 that insulates a portion of the launch vehicle 2402 and may also serve as a cryogenic fluid plenum 2618 to ensure close thermal contact of stored cryogenic fluid with the portion of the launch vehicle 2402 that requires cooling.

Although applicant has described applicant's preferred embodiments of this invention, it will be understood that the broadest scope of this invention includes such modifications as diverse shapes and sizes and materials. Such scope is limited only by the above specification.

Further, many other advantages of applicant's invention will be apparent to those skilled in the art from the above descriptions and the claims below.

We claim:

1. An airborne rocket launch system for launching a liquid-propellant rocket launch vehicle from an aircraft, the system comprising a liquid-propellant rocket launch vehicle support structure further comprising:
   a. a tubular housing having an axial channel operable to enclose the circumference of said liquid-propellant rocket launch vehicle along at least a portion of a length of said liquid-propellant rocket launch vehicle;
   b. a plurality of aerodynamic surfaces extending from at least one outer surface of an aft end of said tubular housing operable to provide aerodynamic stability during release and separation from said aircraft, of said tubular housing enclosing said liquid-propellant rocket launch vehicle;
   c. an attachment interface extending from an external surface of said tubular housing and operable to releasably attach said tubular housing to said aircraft; and
   d. at least one cryogenic fluid enclosure within said tubular housing operable to supply at least one of cooling and replenishment cryogenic propellant within said liquid-propellant rocket launch vehicle.

2. The system of claim 1, further comprising an aerodynamic external shape of said tubular housing and an aerodynamic surface of said tubular housing to reduce drag.

3. The system of claim 1, further comprising a plurality of low friction rails aligned axially in said axial channel of said tubular housing to allow for smooth release of said launch vehicle from said tubular housing after ignition of at least one liquid-fueled rocket engine of said launch vehicle.

4. The system of claim 1, wherein said tubular housing comprises first and second portions releasably fastened along a horizontal split plane and operable to be released after release of said rocket support structure from said aircraft.

5. The system of claim 1, wherein said attachment interface is operable to orient said rocket support structure at an angle to axis of said aircraft.

6. The system of claim 1, further comprising at least one quick disconnect port in said tubular housing for transfer of propellants and other fluids to at least one of said launch vehicle and said tubular housing.

7. The system of claim 1, further comprising a launch controller for controlling separation of said tubular housing containing said launch vehicle and for controlling launch of said launch vehicle from said tubular housing, wherein a first portion of said control system resides within said aircraft and a second portion of said control system resides within said tubular housing.

8. The system of claim 1, wherein said tubular housing comprises an outer wall and an inner wall and at least one semi-circumferential cryogenic tank between said inner wall and said outer wall.

9. The system of claim 1, wherein said tubular housing comprises an insulated tubular wall, a cryogenic fluid plenum between an un-insulated outer surface of said launch vehicle and said insulated tubular wall, and between fore and aft circumferential seals between said launch vehicle and said insulated tubular wall.

10. The system of claim 1, wherein said launch vehicle comprises a cryogenic fuel tank having an internal fluidic heat exchanger.

11. The system of claim 1, comprising an ejectable nose cap releasably attachable to a front end of said tubular housing.

12. The system of claim 1, further comprising a plurality of aft-directed stabilization thrusters within said aft end of said tubular housing.

13. The system of claim 12, wherein said plurality of stabilization thrusters is sized to overcome aerodynamic deceleration after separation of said rocket support structure from said aircraft to ensure that first and second liquid propellants within said launch vehicle remain urged towards a respective propellant inlet of at least one liquid-fueled rocket engine of said launch vehicle.

14. The system of claim 1, further comprising a complimentary attachment interface that is one of integral to and releasably attached to said aircraft.

15. The system of claim 14, wherein said releasably attached complimentary attachment interface comprises a pylon-mountable device further comprising:
   a. a pylon interface operable to attach said pylon-mountable device to a pylon of one of said aircraft and any other aircraft with a compatible pylon;
   b. a pylon interface panel operable to ejectably attach to said pylon interface;
   c. a support equipment housing attached to said pylon interface panel;
   d. first and second cryogenic support tanks attached to said support equipment housing;
   e. fluidic conduits, couplings, and controls housed within said support equipment housing; and
   f. electrical conduits, couplings, and controls for power and signals housed within said support equipment housing.

16. An airborne launch system for launching a liquid-fueled launch vehicle from an aircraft, the system comprising a liquid-propellant rocket launch vehicle support structure further comprising:
   a. a tubular housing having an axial channel for enclosing the circumference of said liquid-propellant rocket launch vehicle along at least a portion of a length of said liquid-propellant rocket launch vehicle;

b. a plurality of aerodynamic surfaces extending from at least one outer surface of an aft end of said tubular housing operable to provide aerodynamic stability during the release and separation of said tubular housing enclosing said liquid-propellant rocket launch vehicle;

c. an attachment interface extending from an external surface of said tubular housing and operable to attach said rocket support structure to an aircraft; and d. further comprising a complimentary attachment interface that is one of integral to and attached to said aircraft.

17. The system of claim 16, wherein said tubular housing comprises one of:

a. an outer wall and an inner wall and at least one semi-circumferential cryogenic tank between said inner wall and said outer wall;

b. an insulated wall, a cryogenic fluid plenum between an un-insulated outer surface of said liquid-propellant rocket launch vehicle and said insulated wall, and between fore and aft circumferential seals between said liquid-propellant rocket launch vehicle and said insulated wall; and c. a cryogenic fluid inlet to said launch vehicle, wherein said launch vehicle comprises a cryogenic propellant tank having an internal fluidic heat exchanger.

18. The system of claim 16, further comprising a plurality of aft-directed stabilization thrusters within said aft end of said tubular housing, wherein said plurality of stabilization thrusters is sized to overcome aerodynamic deceleration after separation of said tubular housing from said aircraft to ensure that first and second liquid propellants within said launch vehicle are urged towards respective inlets of at least one rocket engine of said launch vehicle.

19. The system of claim 16, comprising an ejectable nose cap releasably attachable to a front end of said tubular housing.

20. The system of claim 16, further comprising a launch controller for controlling separation of said tubular housing containing said launch vehicle and for controlling launch of said launch vehicle from said tubular housing, wherein a first portion of said control system resides within said aircraft and a second portion of said control system resides within said tubular housing.

21. An airborne rocket launch system for launching a liquid-propellant launch vehicle from an aircraft, the system comprising:

a. a tubular housing having an axial channel for enclosing the circumference of said liquid-propellant launch vehicle along at least a portion of a length of said liquid-propellant launch vehicle wherein said tubular housing comprises one of:
  i. an outer wall and an inner wall and at least one semi-circumferential cryogenic tank between said inner wall and said outer wall;
  ii. an insulated wall, a plenum between an un-insulated outer surface of said launch vehicle and said insulated wall, and between fore and aft circumferential seals between said launch vehicle and said insulated wall, wherein said volume of cryogenic fluid comprises cryogenic fluid in said plenum; and
  iii. a cryogenic fluid inlet to said launch vehicle, wherein said launch vehicle comprises a cryogenic fuel tank having an internal fluidic heat exchanger;

b. a plurality of stabilizer fins extending radially from an aft end of said tubular housing;

c. an attachment interface extending from an external surface of said tubular housing and operable to attach said tubular housing to an aircraft;

d. further comprising a complimentary attachment interface that is one of integral to and attached to said aircraft;

e. further comprising a launch controller for controlling separation of said tubular housing containing said launch vehicle and for controlling launch of said launch vehicle from said tubular housing, wherein a first portion of said control system resides within said aircraft and a second portion of said control system resides within said tubular housing.

22. The system of claim 21, further comprising one of:

a. a plurality of aft-directed stabilization thrusters within said aft end of said tubular housing, wherein said plurality of stabilization thrusters is sized to overcome aerodynamic deceleration after separation of said tubular housing from said aircraft to ensure that first and second liquid propellants within said launch vehicle does not slosh away from respective propellant tank outlet ports of said launch vehicle; and b. an ejectable nose cap releasably attachable to a front end of said tubular housing.

* * * * *